US007492752B2

(12) United States Patent
Harris et al.

(10) Patent No.: US 7,492,752 B2
(45) Date of Patent: Feb. 17, 2009

(54) METHOD AND APPARATUS FOR IMPROVED CHANNEL MAINTENANCE SIGNALING

(75) Inventors: John M. Harris, Chicago, IL (US); Joseph R. Schumacher, Glen Ellyn, IL (US); Vijay G. Subramanian, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 441 days.

(21) Appl. No.: 11/411,753

(22) Filed: Apr. 25, 2006

(65) Prior Publication Data

US 2006/0268788 A1 Nov. 30, 2006

Related U.S. Application Data

(60) Provisional application No. 60/684,428, filed on May 25, 2005.

(51) Int. Cl.
*H04Q 7/20* (2006.01)

(52) U.S. Cl. ........................ 370/342; 370/318; 370/338; 370/501; 370/352; 370/331; 455/68; 455/522; 455/550.1; 455/436

(58) Field of Classification Search ......... 370/331–338, 370/342–347, 318, 312, 352, 501; 455/450–453, 455/69, 522, 436, 517, 550.1, 560, 552.1
See application file for complete search history.

(56) References Cited

U.S. PATENT DOCUMENTS 6,347,091 B1 * 2/2002 Wallentin et al. ........... 370/328
6,597,705 B1 7/2003 Rezaiifar et al.
7,397,790 B2 * 7/2008 Zeira et al. .................. 370/352
2002/0039355 A1 4/2002 Yun et al.
2003/0058833 A1 3/2003 Jou
2003/0161285 A1 8/2003 Tiedemann, Jr. et al.
2003/0185159 A1 10/2003 Seo et al.
2004/0001429 A1 * 1/2004 Ma et al. .................... 370/342
2004/0196861 A1 * 10/2004 Rinchiuso et al. ........... 370/441
2004/0219920 A1 11/2004 Love et al.
2004/0253955 A1 * 12/2004 Love et al. .................. 455/442
2005/0124369 A1 * 6/2005 Attar et al. .................. 455/522
2005/0201296 A1 * 9/2005 Vannithamby et al. ...... 370/241
2006/0040674 A1 * 2/2006 Vannithamby et al. ... 455/452.2
2006/0146750 A1 * 7/2006 Chen et al. .................. 370/331
2006/0153216 A1 * 7/2006 Hosein et al. ............... 370/412

OTHER PUBLICATIONS

Cui, Dongzhe et al.: "Reverse DRC channel performance analysis for 1xEV-Do: Third generation high-speed wireless data systems", Vehicular Technology Conference, 2002, Proceedings, VTC 2002-Fall, 2002 IEEE 56th, vol. 1, Sep. 24-28, 2002, pp. 137-140 vol. 1.
Huang, Ching Yao et al.: "Forward and reverse link capacity for 1xEV-DO: Third generation wireless high-speed data systems", Global Telecommunications Conference, 2002, Globecom '02, IEEE, vol. 1, Nov. 17-21, 2002, pp. 871-875 vol. 1.

* cited by examiner

*Primary Examiner*—Kamran Afshar

(57) ABSTRACT

Various embodiments are described to address the need for channel maintenance/channel quality signaling that can better utilize reverse link capacity and conserve battery life. Generally expressed, a remote unit (101) enters (403) a high-rate-channel-maintenance mode in which it transmits channel maintenance signaling. When a low-rate condition is met (405), the remote unit enters (407) a low-rate-channel-maintenance mode in which it transmits channel maintenance signaling at either a lower rate or a lower transmit power than when in the high-rate-channel-maintenance mode. Then when a high-rate condition is met (409), the remote unit reenters the high-rate-channel-maintenance mode.

15 Claims, 11 Drawing Sheets

300

Standard periodic:

310

Dual periodic:

320

Inactivity based:

360

Packet count (cumulative off):

METHOD AND APPARATUS FOR IMPROVED CHANNEL MAINTENANCE SIGNALING

REFERENCE(S) TO RELATED APPLICATION(S)

The present application claims priority from provisional application, Ser. No. 60/684,428, entitled "METHOD AND APPARATUS FOR IMPROVED CHANNEL MAINTENANCE SIGNALING," filed May 25, 2005, which is commonly owned and incorporated herein by reference in its entirety.

FIELD OF THE INVENTION

The present invention relates generally to wireless communication systems and, in particular, to an apparatus and method for improved channel quality reporting.

BACKGROUND OF THE INVENTION

In existing wireless access technologies such as IEEE 802.16, High Speed Downlink Packet Access (HSDPA), and High Rate Packet Data (HRPD), also known as 1xEV-DO or IS-856, the reverse link transmission of channel quality indications, for example, consume a substantial amount of the available reverse link capacity. In addition, the transmission of CQI (Channel Quality Indicator), DRC (Data Rate Control), and an HS-DPCCH (High Speed Downlink Packet Control Channel), in respective 802.16, HRPD, and HSDPA systems reduces remote unit battery life.

Existing technology addresses these issues by using explicit access network (AN) signaling to toggle remote unit CQI/DRC transmissions. Thus, the AN can thereby enable the remote units to stop transmitting channel quality information when the AN does not need the information. For example, a remote unit may be in a CQI/DRC gating mode in which channel quality information is transmitted on the reverse link in periodic bursts. The AN may signal the remote unit to transition to a CQI/DRC DTX (discontinuous transmission) mode in which the transmission of channel quality information is suspended. Then, when the channel quality information is needed again, the AN signals the remote unit to return to CQI/DRC gating mode. However, such AN signaling to control the remote unit transmit mode also creates additional overhead signaling that itself can become burdensome. This signaling can also create delays by requiring the AN to first signal the remote unit to resume CQI/DRC transmission before the AN proceeds to transmit data to the remote unit.

Therefore, a need exists for an improved apparatus and method for channel maintenance/quality signaling that can better utilize reverse link capacity and conserve battery life.

Specific embodiments of the present invention are disclosed below with reference to FIGS. 1-5. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

DETAILED DESCRIPTION OF THE EMBODIMENTS

Various embodiments are described to address the need for channel maintenance/channel quality signaling that can better utilize reverse link capacity and conserve battery life. Generally expressed, a remote unit enters a high-rate-channel-maintenance mode in which it transmits channel maintenance signaling. When a low-rate condition is met, the remote unit enters a low-rate-channel-maintenance mode in which it transmits channel maintenance signaling at either a lower rate or a lower transmit power than when in the high-rate-channel-maintenance mode. Then when a high-rate condition is met, the remote unit reenters the high-rate-channel-maintenance mode.

Figure 1:
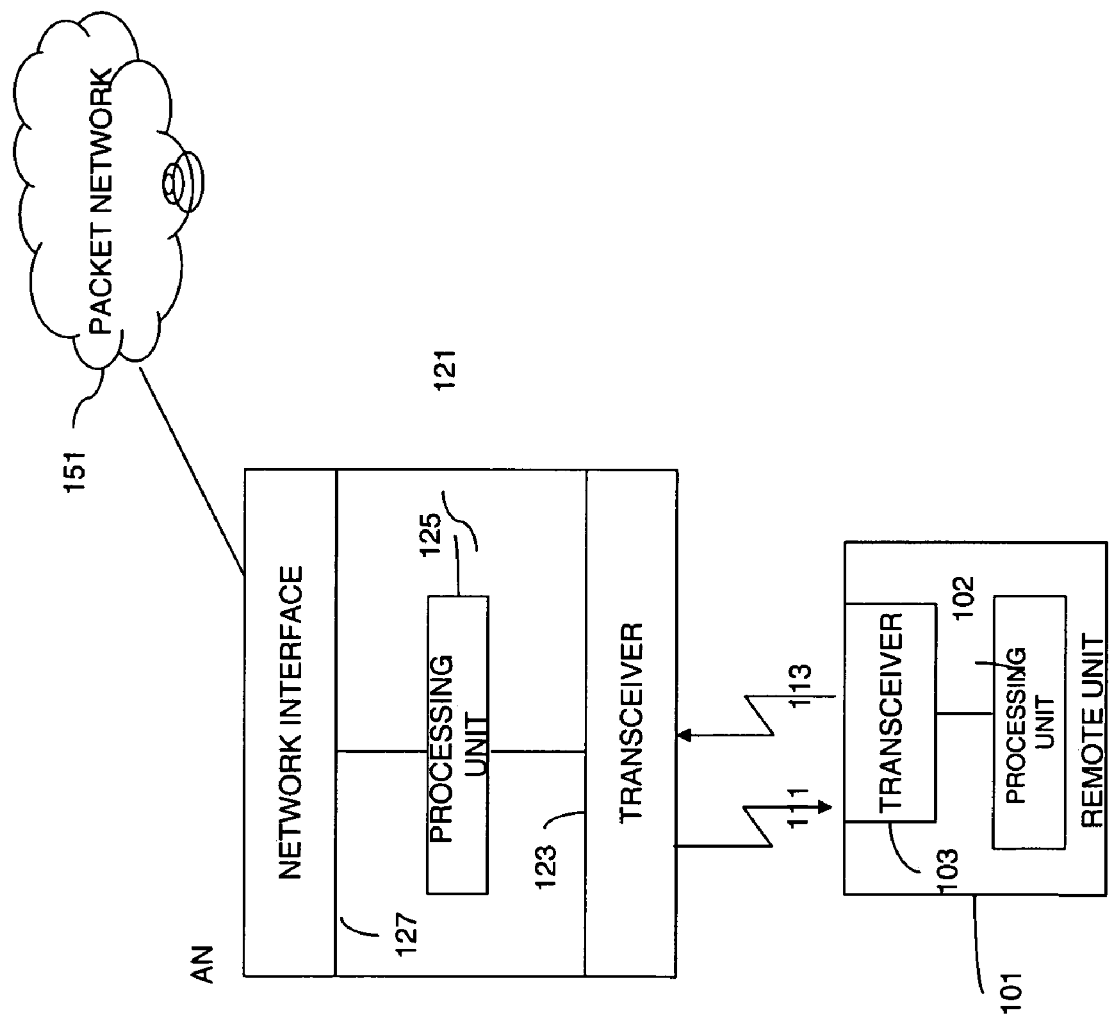
FIG. 1 is a block diagram depiction of a wireless communication system in accordance with multiple embodiments of the present invention.

The disclosed embodiments can be more fully understood with reference to FIGS. 1-5. FIG. 1 is a block diagram depiction of a wireless communication system 100 in accordance with multiple embodiments of the present invention. At present, standards bodies such as OMA (Open Mobile Alliance), 3GPP (3rd Generation Partnership Project), 3GPP2 (3rd Generation Partnership Project 2) and IEEE (Institute of Electrical and Electronics Engineers) 802 are developing standards specifications for wireless telecommunications systems. (These groups may be contacted via http://www.openmobilealliance.com, http://www.3gpp.org/, http://www.3gpp2.com/ and http://www.ieee802. org/, respectively.) Communication system 100 represents a system having an access network that may be based on different wireless technologies. For example, the description that follows will assume that AN 121 is IEEE 802.XX-based, employing wireless technologies such as IEEE's 802.11, 802.16, or 802.20. Being 802.XX-based, AN 121 is additionally modified to implement embodiments of the present invention.

However, alternative embodiments of the present invention may be implemented in communication systems that employ other or additional technologies such as, but not limited to, those described in the 3GPP2 specifications (e.g., CDMA 2000 or High Rate Packet Data (HRPD), which is also known as 1xEV-DO), those described in the 3GPP specifications (e.g., GSM, GPRS, EDGE, W-CDMA, UTRAN, FOMA, UMTS, HSDPA, and HSUPA), those described in the IS-95 (CDMA) specification, 1xEV-DV technologies, and integrated dispatch enhanced network technologies.

More specifically, communication system 100 comprises remote unit 101, access network (AN) 121, and packet network 151. Those skilled in the art will recognize that FIG. 1 does not depict all of the network equipment necessary for system 100 to operate but only those system components and logical entities particularly relevant to the description of embodiments herein. For example, ANs are known to comprise one or more devices such as WLAN (wireless local area network) stations (which include access points (APs), AP controllers/switches, and/or WLAN switches), base transceiver stations (BTSs), base site controllers (BSCs) (which include selection and distribution units (SDUs)), packet control functions (PCFs), packet control units (PCUs), and/or radio network controllers (RNCs). However, none of these devices are specifically shown in FIG. 1.

Instead, AN 121 is depicted in FIG. 1 as comprising processing unit 125, network interface 127, and transceiver 123. In general, components such as processing units, network interfaces, and transceivers are well-known. For example, AN processing units are known to comprise basic components such as, but not limited to, microprocessors, microcontrollers, memory devices, application-specific integrated circuits (ASICs), and/or logic circuitry. Such components are typically adapted to implement algorithms and/or protocols that have been expressed using high-level design languages or descriptions, expressed using computer instructions, expressed using messaging flow diagrams, and/or expressed using logic flow diagrams.

Thus, given an algorithm, a logic flow, a messaging/signaling flow, and/or a protocol specification, those skilled in the art are aware of the many design and development techniques available to implement an AN processing unit that performs the given logic. Therefore, AN 121 represents a known AN that has been adapted, in accordance with the description herein, to implement multiple embodiments of the present invention. Furthermore, those skilled in the art will recognize that aspects of the present invention may be implemented in and across various physical components and none are necessarily limited to single platform implementations. For example, the AN aspect of the present invention may be implemented in any of the AN devices listed above or distributed across such components.

AN 121 uses wireless interfaces 111 and 113 for communication with remote unit 101. Since, for the purpose of illustration, AN 121 is IEEE 802.XX-based, wireless interfaces 111 and 113 correspond to a forward link and a reverse link, respectively, each link comprising a group of IEEE 802.XX-based channels suitably modified to implement embodiments of the present invention.

Remote unit platforms are known to refer to a wide variety of consumer electronic platforms such as, but not limited to, mobile stations (MSs), mobile nodes (MNs), access terminals (ATs), terminal equipment, gaming devices, personal computers, and personal digital assistants (PDAs). In particular, remote unit 101 comprises processing unit 102, transceiver 103, a keypad (not shown), a speaker (not shown), a microphone (not shown), and a display (not shown). Processing units, transceivers, keypads, speakers, microphones, and displays as used in remote units are all well-known in the art.

For example, remote unit processing units are known to comprise basic components such as, but not limited to, microprocessors, digital signal processors (DSPs), microcontrollers, memory devices, application-specific integrated circuits (ASICs), and/or logic circuitry. Such remote unit components are typically adapted to implement algorithms and/or protocols that have been expressed using high-level design languages or descriptions, expressed using computer instructions, expressed using messaging/signaling flow diagrams, and/or expressed using logic flow diagrams. Thus, given an algorithm, a logic flow, a messaging/signaling flow, a call flow, and/or a protocol specification, those skilled in the art are aware of the many design and development techniques available to implement user equipment that performs the given logic. Therefore, remote unit 101 represents a known remote unit that has been adapted, in accordance with the description herein, to implement embodiments of the present invention.

Figure 2:
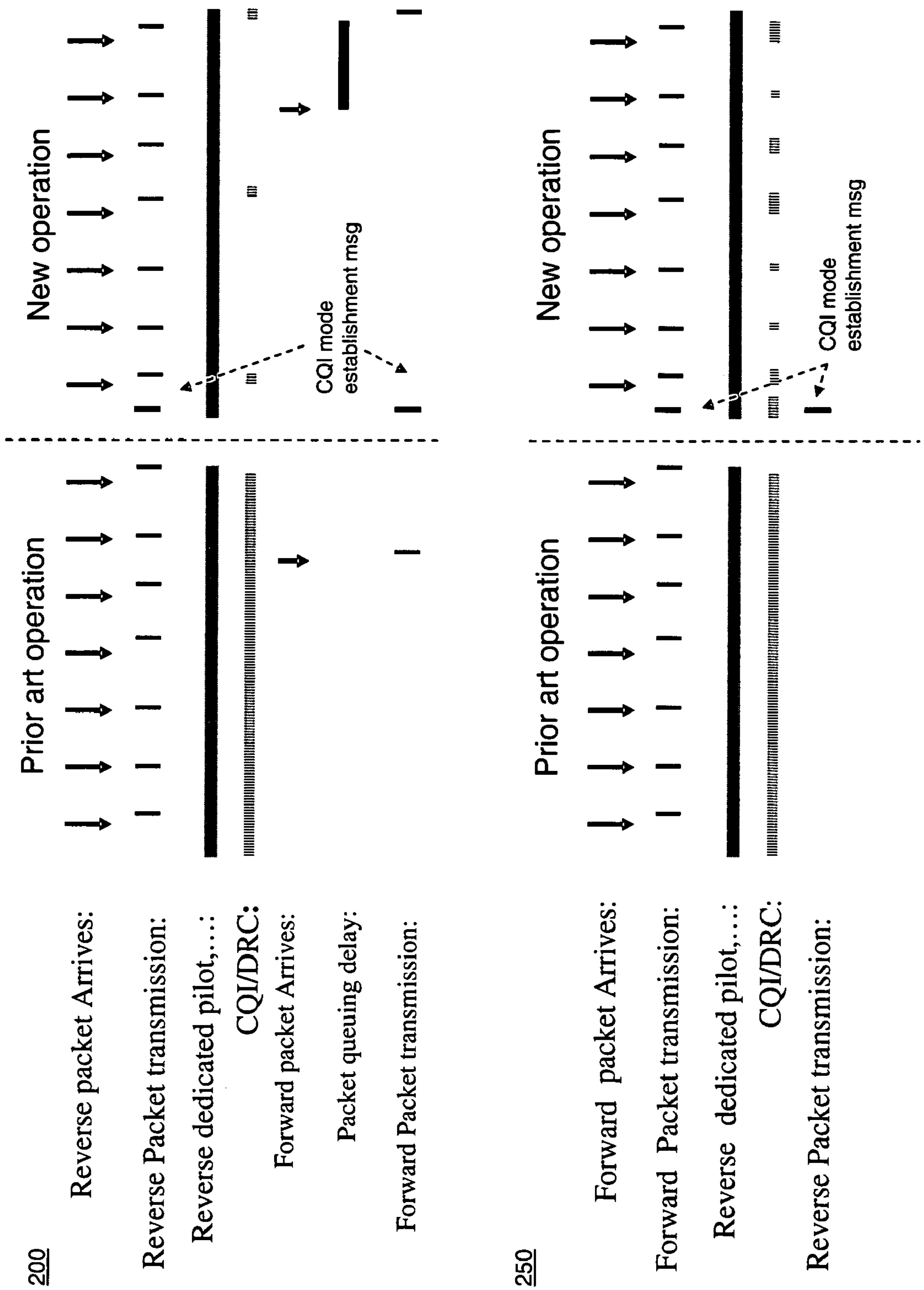
FIG. 2 is a block diagram depiction of exemplary signaling timelines that compare prior art signaling with signaling in accordance with multiple embodiments of the present invention.
Figure 3A:
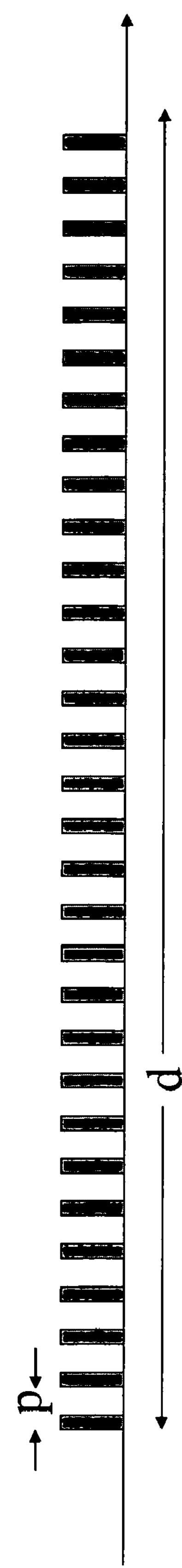
FIGS. 3A-3G, considered together (hereinafter "FIG. 3"), form a series of exemplary signaling timelines that depict channel maintenance signaling in which different conditions are used to enter a low-rate-channel-maintenance mode, in accordance with multiple embodiments of the present invention.
Figure 3B:
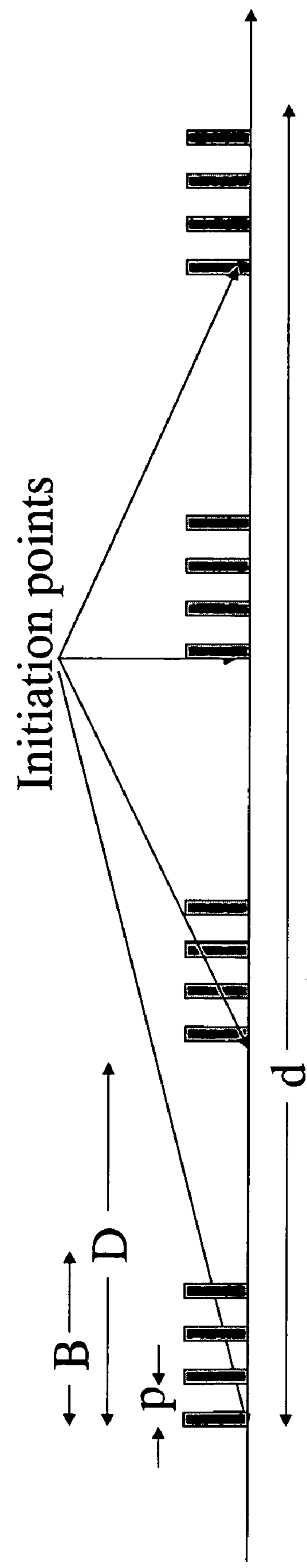
Figure 3C:
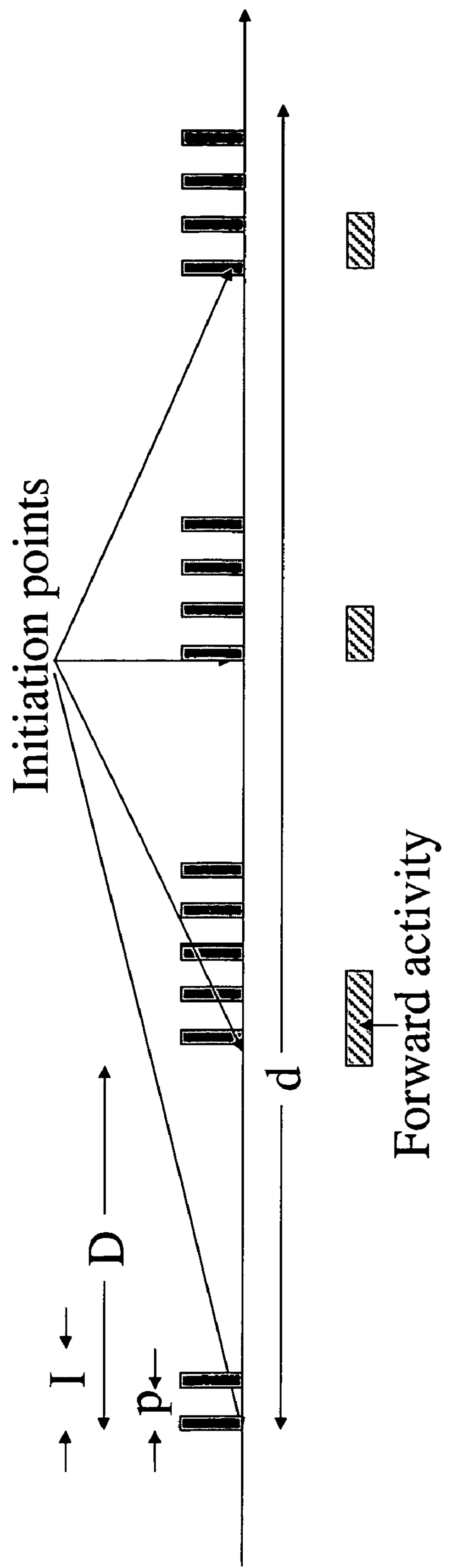
Figure 3D:
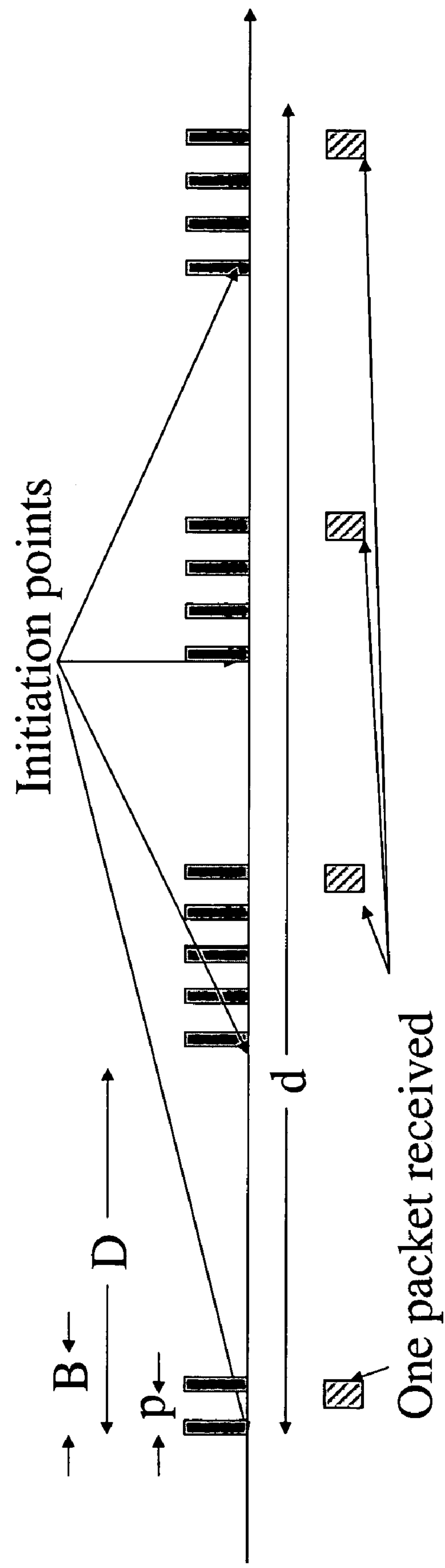
Figure 3E:
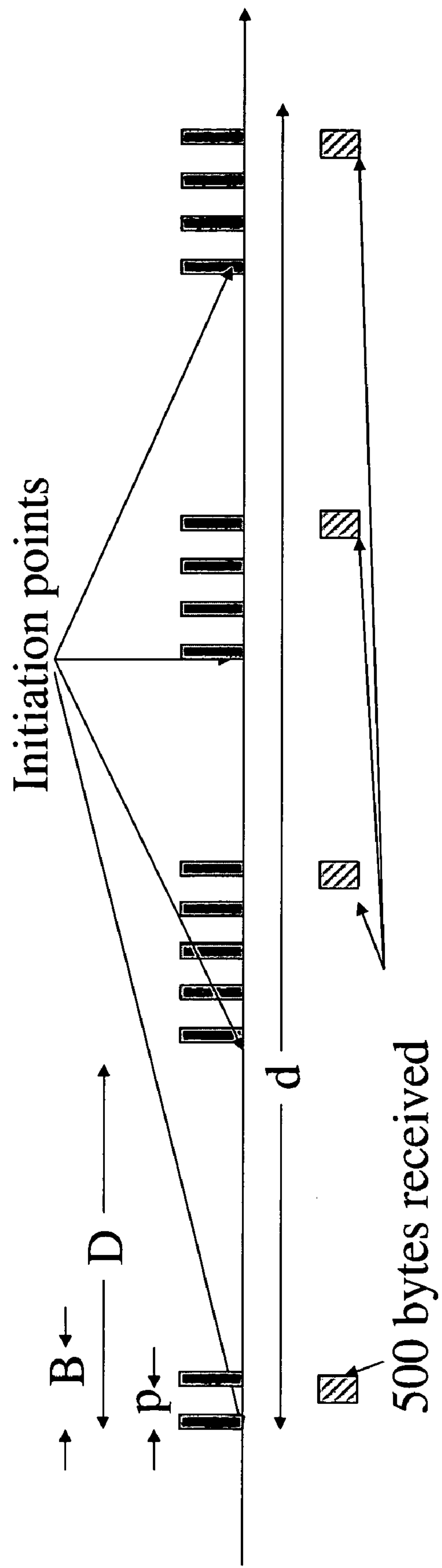
Figure 3F:
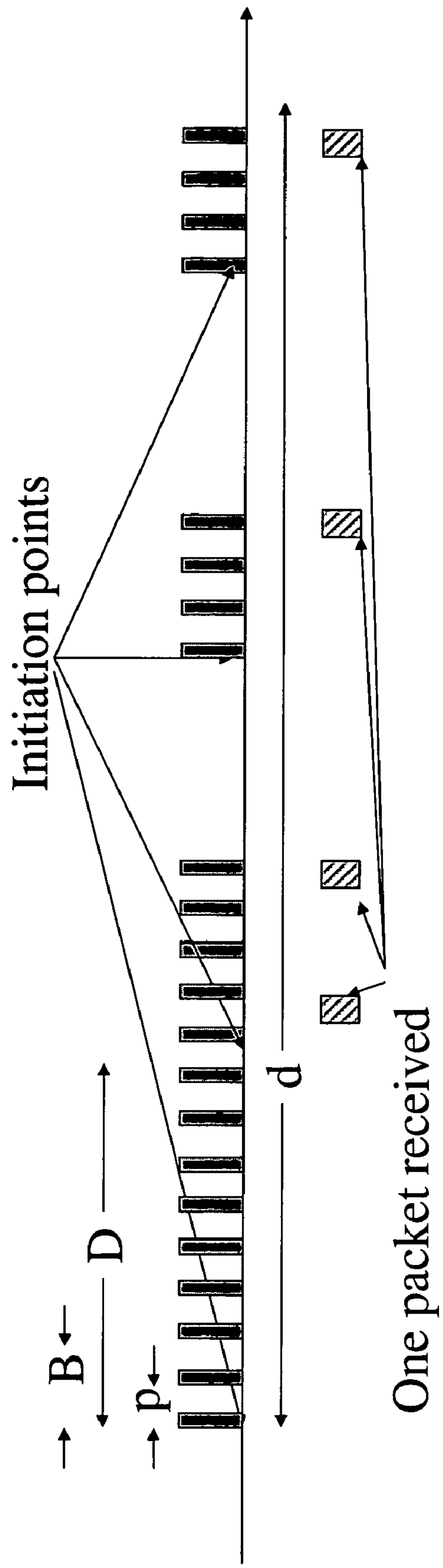
Figure 3G:
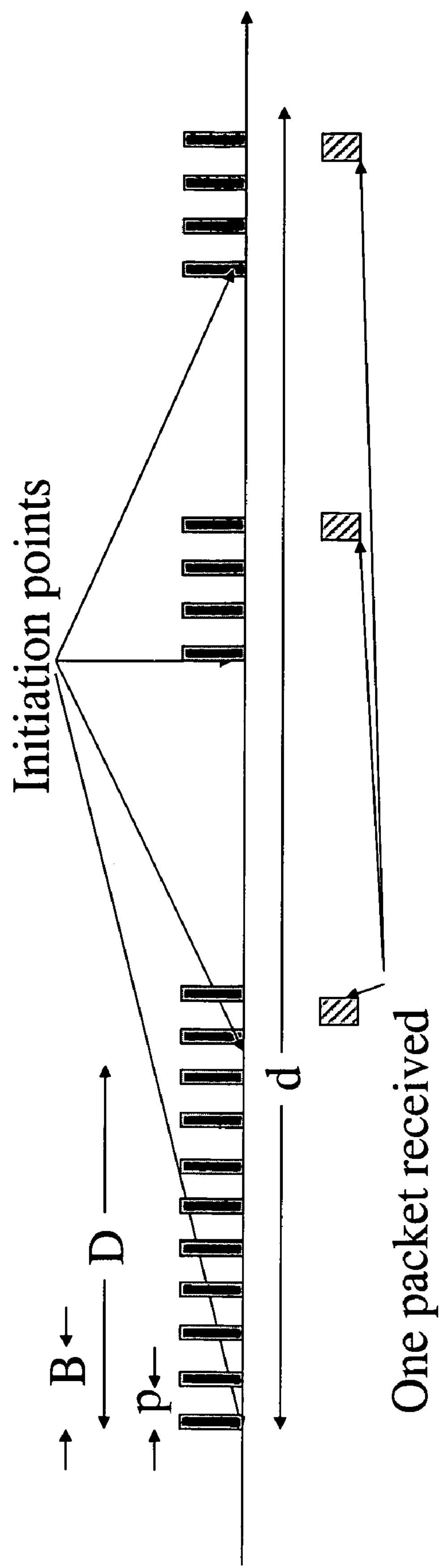

A discussion of certain embodiments in greater detail follows first with reference to FIG. 2. FIG. 2 is a block diagram depiction of exemplary signaling timelines that compare prior art signaling with signaling in accordance with multiple embodiments of the present invention. Prior art techniques for providing channel quality feedback, such as CQI or DRC (data rate control) signaling, via the reverse link are not optimized for uplink-transfer-only situations. Such uplink-only transmission intervals often occur when providing services such as PTT (push-to-talk)/dispatch half duplex calling, for example. A PTT application on a remote unit is aware that it is very unlikely to receive any packets on the forward link for a sustained interval while it is the PTT speaker. In this case, the remote unit would prefer to use channel quality feedback DTX (discontinuous transmission) mode in order to conserve battery life and reduce reverse link interference.

However, it is possible that an unexpected packet will arrive at the infrastructure for transmission to the remote unit via the forward link during this PTT speaker interval. In order to address this possibility, the remote unit and infrastructure should agree upon and use a policy whereby the remote unit will periodically switch to a channel quality feedback gating mode, in which CQI/DRC gated transmission occurs, for a fixed interval of time. In between these intervals the remote unit will use the channel quality feedback DTX mode. If any unexpected packets show up during this substantially uplink-transfer-only interval then the infrastructure can queue the packets until the target remote unit's next agreed-upon channel quality feedback gating mode interval. This operation is depicted in signaling timeline 200. In addition, if the remote unit does begin receiving packets, the remote unit can then be instructed to resume its more continuous gated CQI/DRC transmission.

In addition, prior art techniques for channel quality feedback gating are also not optimized for remote units that are receiving a streaming service. During such streaming services, the infrastructure will occasionally receive a packet destined for the remote unit. Current, standardized channel quality feedback policies require an explicit message when switching between channel quality feedback gating and channel quality feedback DTX modes. An inordinate number of prior art messages would thus be required to toggle the channel quality feedback gating mode before and after each streamed packet. Therefore, the system is unable to fully exploit all the intervals in which the remote unit could otherwise use channel quality feedback DTX mode.

To address this problem, certain embodiments of the present invention provide a single message instructing the remote unit to periodically switch to channel quality feedback gating mode for a predefined interval and to use channel quality feedback DTX mode in between these predefined intervals. In addition, the gated transmission interval can be defined as ending after the remote unit fails to receive any forward traffic channel packets for a given period of time. In this way, the channel quality feedback gating mode can extend longer as needed but without requiring a specific message to change the channel quality feedback mode for each packet. Some of these embodiments are depicted in signaling timeline 250.

Figure 4:
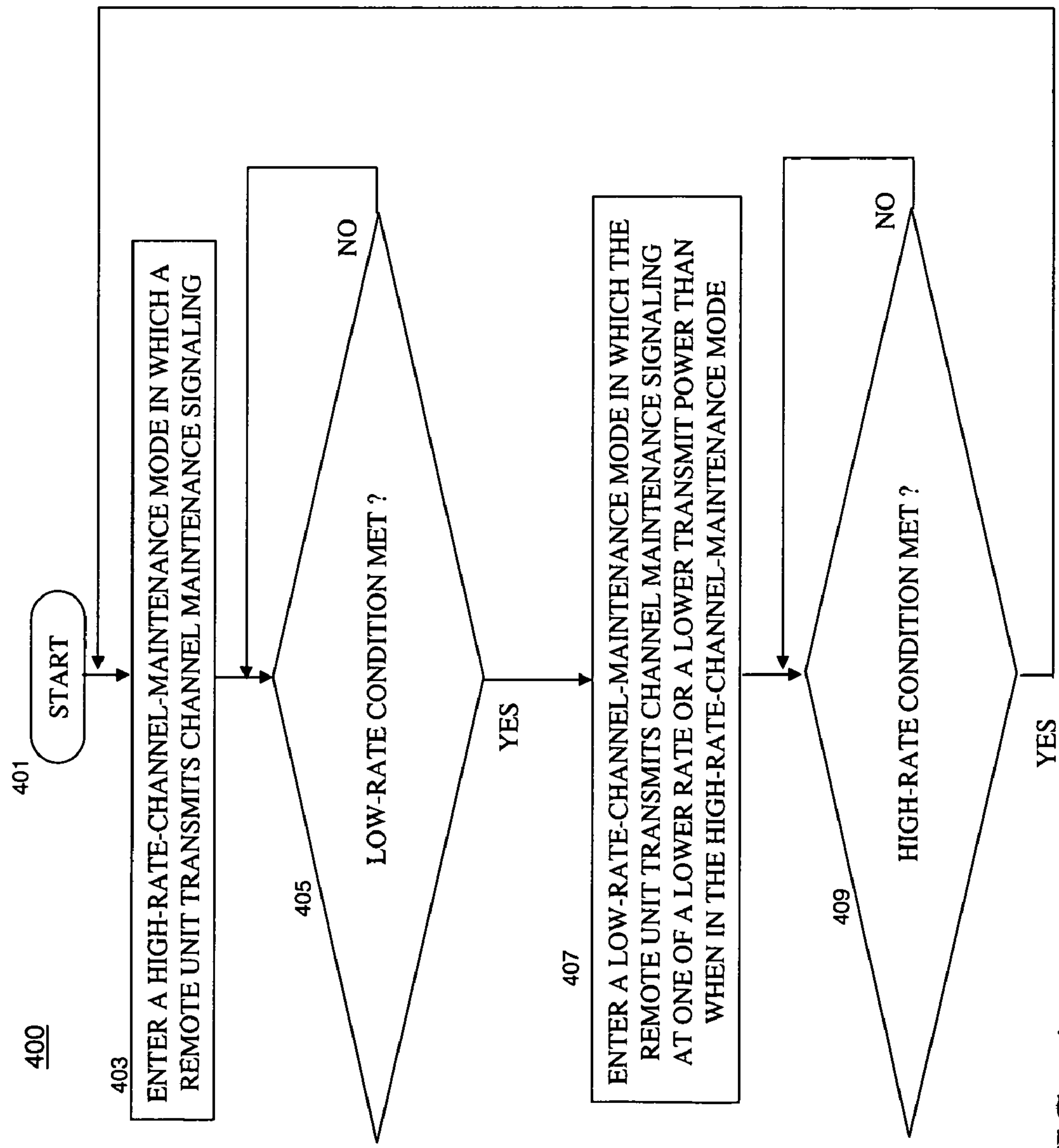
FIG. 4 is a logic flow diagram of functionality performed by a remote unit in accordance with multiple embodiments of the present invention.

More generally, many embodiments of the present invention may be considered with reference to FIGS. 3 and 4. FIG. 4 is a logic flow diagram of functionality performed by a remote unit in accordance with multiple embodiments of the present invention. Logic flow 400 begins (401) when the remote unit enters (403) a high-rate-channel-maintenance mode in which the remote unit transmits channel maintenance signaling. The channel maintenance signaling referred to may include one or more types of signaling such as channel quality indication (CQI) signaling, power control signaling, reverse dedicated pilot signaling, forward dedicated pilot signaling, and ACK/NACK signaling.

The remote unit remains in the high-rate-channel-maintenance mode until a low-rate condition is satisfied (405). The remote unit then enters (407) a low-rate-channel-maintenance mode in which the remote unit transmits the channel maintenance signaling at either a lower rate or a lower transmit power as compared to its channel maintenance signaling when in the high-rate-channel-maintenance mode. For example, if the channel maintenance signaling includes power control, then the remote unit may send the power control bits at a lower rate while in the low-rate-channel-maintenance mode than when it was previously in the high-rate-channel-maintenance mode. Likewise, for the case where the channel maintenance signaling includes channel quality indication signaling (such as DRC), the remote unit may send the channel quality indications at a lower rate than when the remote unit was in the high-rate-channel-maintenance mode.

The transmission of channel maintenance signaling at a lower rate may even include suspending the channel maintenance signaling altogether. In one example, both the channel quality indication signaling and the reverse dedicated pilot may be suspended in the low-rate-channel-maintenance mode. In another example, when the remote unit enters the low-rate-channel-maintenance mode, transmission of the reverse dedicated pilot is unchanged while the channel quality indication signaling is suspended.

The low-rate condition that triggers the remote unit to enter the low-rate-channel-maintenance mode can be one (or a combination) of many different conditions depending on the particular service being supported or the embodiment implemented. Thus, the low-rate condition may be satisfied by any one of a number of component conditions being satisfied or alternatively by all of a combination of component conditions being satisfied. FIG. 3 includes a series of exemplary signaling timelines that depict channel maintenance signaling in which different conditions are used to enter a low-rate-channel-maintenance mode, in accordance with multiple embodiments of the present invention. For example, signaling timeline 300 depicts CQI signaling by the remote unit in the high-rate-channel-maintenance mode for a period d. As depicted, transmission of the CQI signaling occurs in a gated fashion (having a period p) rather than in a continuous transmit fashion.

Signaling timeline 310 depicts CQI signaling in which the low-rate condition requires a pre-established period of time B to elapse after the remote unit last entered the high-rate-channel-maintenance mode. Signaling timeline 320 depicts CQI signaling in which the low-rate condition requires a pre-established period of time to elapse after link activity completes on a forward link associated with the channel maintenance signaling. Signaling timeline 330 depicts CQI signaling in which the low-rate condition requires a pre-established number of packets (one packet, e.g.) to first be received via the forward link. Signaling timeline 340 depicts CQI signaling in which the low-rate condition requires a pre-established number of bytes (500 bytes, e.g.) to first be received via the forward link. Similar to the examples depicted in timelines 330 and 340, but not additionally depicted, are the cases in which the low-rate condition requires a pre-established number of packets or bytes to first be successfully transmitted via a reverse link. Signaling timeline 350 depicts CQI signaling in which the low-rate condition requires a cumulative number of packets or bytes to first be received via the forward link that total the sum of a pre-established number (one packet, e.g.) for each high-rate initiation point that has passed. Finally, signaling timeline 360 depicts CQI signaling in which the low-rate condition requires a non-cumulative, pre-established number (one packet, e.g.) to first be received via the forward link after any high-rate initiation point.

Thus, the remote unit remains in the high-rate-channel-maintenance mode until a low-rate condition such as one or more of the conditions described above is satisfied (405). The remote unit then enters (407) the low-rate-channel-maintenance mode in which the remote unit transmits the channel maintenance signaling at either a lower rate or a lower transmit power as compared to its channel maintenance signaling when in the high-rate-channel-maintenance mode.

The remote unit remains in the low-rate-channel-maintenance mode until a high-rate condition is satisfied (409). When it is, the remote unit reenters (403) the high-rate-channel-maintenance mode from the low-rate-channel-maintenance mode. The high-rate condition that triggers the remote unit to reenter the high-rate-channel-maintenance mode can be one (or a combination) of many different conditions depending on the particular service being supported or the embodiment implemented. Thus, the high-rate condition may be satisfied by any one of a number of component conditions being satisfied or alternatively by all of a combination of component conditions being satisfied.

For example, the exemplary signaling timelines of FIG. 3 depict channel maintenance signaling in which the high-rate condition requires the time remaining until a next periodic, high-rate initiation point after the remote unit enters the low-rate-channel-maintenance mode to elapse. In other words the arrival of the next periodic initiation point satisfies the condition for reentering the high-rate-channel-maintenance mode. Another high-rate condition may require the remote unit to receive a request from the AN to reenter before reentering the high-rate-channel-maintenance mode. Yet another high-rate condition may be satisfied when the remote unit detects that handoff conditions are present for the remote unit. Finally, another high-rate condition may be satisfied when the remote unit begins receiving data via a forward link associated with the channel maintenance signaling.

In view of the more general description above, operation of certain specific embodiments will be described below with reference first to FIG. 1. In embodiments in which the network sets the channel maintenance signaling policy for the remote unit, the AN may transmit a policy establishment message to the remote unit that includes parameters that define how the different signaling modes should be used. For example, AN processing unit 125 sends an indication to remote unit 101, via transceiver 123 and wireless interface 111, that remote unit 101 should transition from a high-rate-channel-maintenance mode to a low-rate-channel-maintenance mode when a low-rate condition is met and that remote unit 101 should transition from the low-rate-channel-maintenance mode to the high-rate-channel-maintenance mode when a high-rate condition is met.

This low-rate-channel-maintenance mode differs from the high-rate-channel-maintenance mode in that remote unit 101 is to transmit channel maintenance signaling at either a lower rate or a lower transmit power than when remote unit 101 is in the high-rate-channel-maintenance mode. Again, the channel maintenance signaling may include signaling of one or more of the following signaling types: channel quality indication (CQI) signaling, power control signaling, reverse dedicated pilot signaling, forward dedicated pilot signaling, and ACK/NACK signaling.

In addition, the indication from AN processing unit 125 may also indicate certain configuration information to more explicitly define the signaling mode policy being established. For example, the low-rate and/or high-rate condition that remote unit 101 should use to switch between modes may be indicated. This could simply be an indication that remote unit 101 should periodically reenter the high-rate-channel-maintenance mode when in the low-rate-channel-maintenance mode. Also, the indication could specify the period of time between such high-rate initiation points. Thus, many different combinations exist for which information is explicitly conveyed verses which information is pre-defined, pre-configured, implied, separately negotiated, etc. between remote unit 101 and AN 121.

Remote unit processing unit 102 receives the indication from AN 121 via transceiver 103 and may respond by simply acknowledging the channel maintenance signaling policy indicated or may respond by indicating configuration information itself, possibly as part of a negotiation process with AN 121. In accordance with the established channel maintenance signaling policy, remote unit processing unit 102 enters the high-rate-channel-maintenance mode in which channel maintenance signaling is transmitted via transceiver 103. In some embodiments or in some configurations, processing unit 102 sends an indication to AN processing unit 125, via transceivers 103 and 123, that it is entering the high-rate-channel-maintenance mode.

Then when the low-rate condition is satisfied, processing unit 102 enters the low-rate-channel-maintenance mode in which channel maintenance signaling is transmitted via transceiver 103 at either a lower rate or a lower transmit power than when in the high-rate-channel-maintenance mode. Again, in some embodiments or in some configurations, processing unit 102 will send an indication to AN processing unit 125, via transceivers 103 and 123, that it is entering the low-rate-channel-maintenance mode. Then when the high-rate condition is satisfied, processing unit 102 reenters the high-rate-channel-maintenance mode. The high-rate condition that triggers this mode switch may include, whether indicated by AN 121 or not, a situation in which processing unit 102, via transceiver 103, detects that handoff conditions are present and/or it begins receiving data via a forward link of wireless interface 111.

Figure 5:
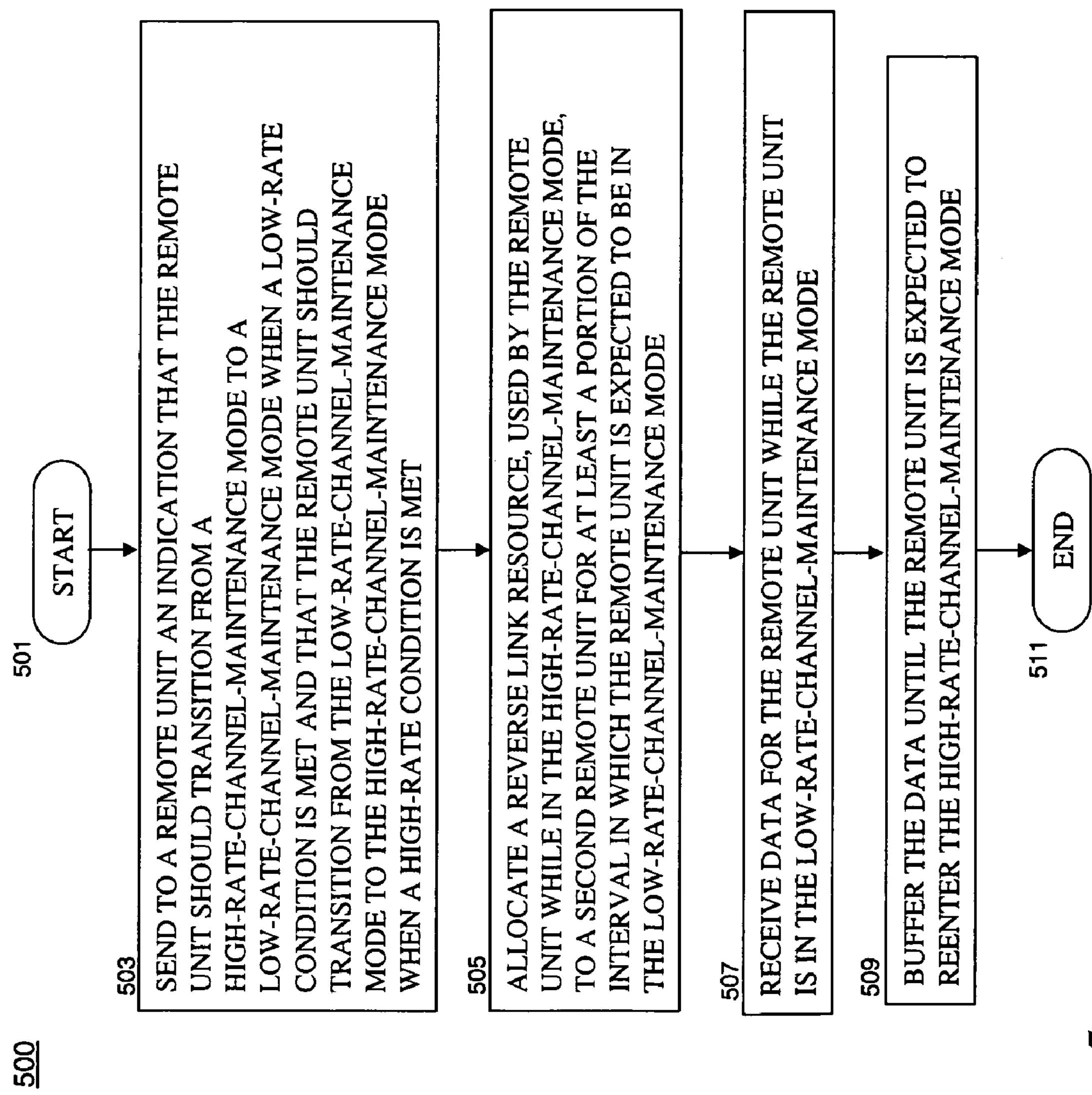
FIG. 5 is a logic flow diagram of functionality performed by an access network (AN) in accordance with multiple embodiments of the present invention.

FIG. 5 is a logic flow diagram of functionality performed by an AN in accordance with multiple embodiments of the present invention. Logic flow 500 begins (501) with the AN sending (503) an indication to a remote unit that the remote unit should transition from a high-rate-channel-maintenance mode to a low-rate-channel-maintenance mode when a low-rate condition is met and that the remote unit should transition from the low-rate-channel-maintenance mode to the high-rate-channel-maintenance mode when a high-rate condition is met. The discussion above with respect to FIG. 1 provides an example of this AN operation.

In some embodiments, the AN may also allocate (505) the link resource used by the remote unit while in the high-rate-channel-maintenance mode to another remote unit for at least a portion of the interval in which the remote unit is expected to be in the low-rate-channel-maintenance mode. In this way, the AN can attempt to utilize the link resources freed by the mode switching techniques described herein. In addition, the low-rate and high-rate conditions may be established/configured to facilitate the allocation of freed link resources. For example, the high-rate condition may be configured in order to provide a predictable interval during which another remote unit can be assigned the link resource. Thus, in addition to transmitting a policy establishment message/indication to remote unit 101 to convey how the signaling modes should be used, AN processing unit 125 may also transmit, to another remote unit (not shown) via transceiver 123, a link assignment message that assigns a link resource for a periodically reoccurring interval of time, thereby enabling the reverse link resource to be shared by a plurality of remote units.

In some embodiments, when the AN receives (507) data for the remote unit while the remote unit is in the low-rate-channel-maintenance mode, the AN buffers (509) the data until the remote unit is expected to reenter the high-rate-channel-maintenance mode. The AN, then either anticipating that the remote unit is reentering the high-rate-channel-maintenance mode (perhaps as scheduled) or receiving some indication that it has already reentered the mode, transmits the data to the remote unit and logic flow 500 ends (511).

Thus, in system 100 for example, AN processing unit 125 would receive data from packet network 151 via network interface 127 for remote unit 101. If remote unit 101 is in the low-rate-channel-maintenance mode, AN processing unit 125 would buffer the data until AN processing unit 125 expects remote unit 101 to reenter the high-rate-channel-maintenance mode. In this way, AN 121 can then transmit the data with the support of better channel maintenance signaling from remote unit 101.

Various embodiments have been discussed that illustrate some of the different ways a remote unit and AN can establish a channel maintenance signaling policy. Detailed message definitions for some IEEE 802.16-based embodiments follow. These message definitions provide some very specific examples of how a channel maintenance signaling policy may be established in an IEEE 802.16-based system. Section number references to the present IEEE 802.16 base-lined standard are provided to indicate which portions of the standard are being updated.

8.4.5.4.15 CQICH Enhanced Allocation IE format

Replace Table 302a with

TABLE 302a

CQICH Enhanced allocation IE format

| Syntax | Size (bits) | Notes |
|---|---|---|
| CQICH_Enhanced_Alloc_IE( ) { | | |
| Extended UIUC | 4 | 0x09 |
| Length | 4 | Length in bytes of following fields |
| CQICH_ID | variable | Index to uniquely identify the CQICH resource assigned to the MS |
| CQICH_MODE | 3 | 000 = Standard Periodic<br>001 = Dual Periodic<br>010 = Inactivity Based<br>011 = Packet Count Based<br>100 = Byte Count Based<br>101-111 - Reserved for future |
| If (CQICH_MODE==000) { | | Standard Periodic |
| Period (=p) | 3 | A CQI feedback is transmitted on the CQICH every 2^p frames |
| Frame offset | 3 | The MS starts reporting at the frame of which the number has the same 3 LSB as the specified frame offset. If the current frame is specified, the MS should start reporting in 8 frames |
| Duration (=d) | 3 | A CQI feedback is transmitted on the CQI channels indexed by the CQICH_ID for 10 × 2^d frames. If d== 000, the CQICH is deallocated. If d == 111, the MS should report until the BS command for the MS to stop. |
| } | — | — |
| If (CQICH_MODE==001) { | | Dual Periodic |
| Period During Gating Mode On (=p) | 3 | A CQI feedback is transmitted on the CQICH every 2^p frames while gating mode on |
| CQI Feedback Duration during Gating Mode On Duration after initiation point (=B) | 3 | While in Gating Mode on, A CQI feedback is transmitted on the CQI channels indexed by the CQICH_ID for (B+1) × 2^p frames. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 3 | This is the number of Frames between the Initiation Points (instants when MSS and infrastructure must enter Gating Mode On). This is measured in frames - the period is 2^p × (B+1) × 2^(D+1). |
| Gating Mode Duration (=d) | 3 | This is the duration for which the gating mode is considered on - If d== 000, the CQICH is deallocated. If d == 111, the MS should report until the BS command for the MS to stop, else the duration is 2^p × (B+1) × 2^(D+1) × 2^(d+1). |
| } | | |
| If (CQICH_MODE==010) { | | Inactivity Based |
| Period During Gating Mode On (=p) | 3 | A CQI feedback is transmitted on the CQICH every 2^p frames while gating mode on |
| Inactivity Duration during Gating Mode On Duration (=B) | 3 | While in Gating Mode on, if there is no activity for 2^p × (B+1) frames, then the CQICH is not transmitted till the next Gating Mode initiation period. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 3 | This is the number of Frames between the Initiation Points (instants when MSS and infrastructure must enter Gating Mode On). This is measured in frames - the period is 2^p × 2^(D+1). |
| Gating Mode Duration (=d) | 3 | This is the duration for which the gating mode is considered on - If d== 000, the CQICH is deallocated. If d == 111, the MS should report until the BS command for the MS to stop, else the duration is 2^p × 2^(D+1) × 2^(d+1). |
| } | | |
| If (CQICH_MODE==011) { | | Packet Count based |
| Period During Gating Mode On (=p) | 3 | A CQI feedback is transmitted on the CQICH every 2^p frames while gating mode on |

TABLE 302a-continued

CQICH Enhanced allocation IE format

| Syntax | Size (bits) | Notes |
|---|---|---|
| Packet Count during Gating Mode On (=B) | 5 | A CQI feedback is transmitted on the CQICH periodically (with period p) until B packets are received or the durations D and/or d elapse. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 5 | This is the number of Frames between the Initiation Points (instants when MSS and infrastructure must enter Gating Mode On). This is measured in frames - the period is 2^p × 2^(D+1) frames. |
| Gating Mode Duration (=d) | 3 | This is the duration for which the gating mode is considered on - If d== 000, the CQICH is deallocated. If d == 111, the MS should report until the BS command for the MS to stop, else the duration is 2^p × 2^(D+1) × 2^d. |
| Cumulative Mode | 1 | Cumulative setting. This parameter is relevant in the case where the required number of packets is not received before the end of the Gating Mode Period.<br>In this case, if cumulative is equal to true, then the MSS does not enter Channel quality feedback DTX mode until it receives the packets not yet received from the prior Gating Mode Period(s) in addition to the packets for this current Gating Mode Period.<br>In this case, if cumulative is equal to false, then the MSS enters Channel quality feedback DTX mode as soon as it receives the packets for the current Gating Mode Period. In other words, it ignores any packets which were not received during prior Gating Mode Period(s). |
| } | | |
| If (CQICH_MODE==100) { | | Byte Count based |
| Packet Size Indicator (=P) | 3 | 10*2^P bytes constitute a packet |
| Period During Gating Mode On (=p) | 3 | A CQI feedback is transmitted on the CQICH every 2^p frames while gating mode on |
| Packet Count during Gating Mode On (=B) | 5 | A CQI feedback is transmitted on the CQICH periodically (with period p) until B packets are received or the durations D and/or d elapse. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 5 | This is the number of Frames between the Initiation Points (instants when MSS and infrastructure must enter Gating Mode On). This is measured in frames - the period is 2^p × 2^(D+1). |
| Gating Mode Duration (=d) | 3 | This is the duration for which the gating mode is considered on - If d== 000, the CQICH is deallocated. If d == 111, the MS should report until the BS command for the MS to stop, else the duration is 2^p × 2^(D+1) × 2^d. |
| Cumulative Mode | 1 | Cumulative setting. This parameter is relevant in the case where the require number of packets is not received before the end of the Gating Mode Period.<br>In this case, if cumulative is equal to true, then the MSS does not enter Channel quality feedback DTX mode until it receives the packets not yet received from the prior Gating Mode Period(s) in addition to the packets for this current Gating Mode Period.<br>In this case, if cumulative is equal to false, then the MSS enters Channel quality feedback DTX mode as soon as it receives the packets for the current Gating Mode Period. In other words, it ignores any packets which were not received during prior Gating Mode Period(s). |
| } | | |

TABLE 302a-continued

CQICH Enhanced allocation IE format

| Syntax | Size (bits) | Notes |
|---|---|---|
| CQICH_Num | 4 | Number of CQICHs assigned to this CQICH_ID is (CQICH_Num +1) |
| For (i=0;i<CQICH_Num+1;i++) { | | |
| Feedback Type | 3 | 000 = Fast DL measurement/Default Feedback with antenna grouping 001 = Fast DL measurement/Default Feedback with antenna selection 010 = Fast DL measurement/Default Feedback with reduced code book 011 = Quantized pre-coding weight feedback 100 = Index to pre-coding matrix in codebook 101 = Channel Matrix Information 101 = Per stream power control 110~111 = Reserved |
| Allocation index | 6 | Index to the Fast-feedback channel region marked by UIUC = 0 |
| CQICH Type | 2 | 00 = 6 bit CQI, 01 = DIUC-CQI, 10 = 3 bit CQI (even), 11 = 3 bit CQI(odd) |
| } | | |
| Band_AMC_Precoding_Mode | 1 | 0 = One common precoder for all bands. 1 = Distinct precoders for the bands with the highest S/N values, up to the number of short term precoders fed back as specified by Nr_Precoders_feedback 3 Nr of precoders feedback = N |
| If (Band_AMC_Precoding_Mode =1) | 3 | Nr of precoders feedback = N |
| { | | |
| Nr_Precoders_feedback (=N) | | |
| } | | |
| Padding | variable | The padding bits are used to ensure the IE size is integer number of bytes. |
| } | | |

6.3.2.3.43.5 CQICH Control IE

Note that the attached message is actually a subset of the entire current message—only depicting the sections which have changed.

Change Table 95 as follows:

TABLE 95

CQICH_Control IE format

| Syntax | Size(bits) | Notes |
|---|---|---|
| CQICH_Control_IE( ) { | — | — |
| CQICH Indicator | 1 | If the indicator is set to 1, the CQICH_Control IE follows. |
| if (CQICH indicator == 1) { | — | — |
| Allocation Index | 6 | Index to the channel in a frame the CQI report should be transmitted by the MS. |
| CQICH_MODE | 3 | 000 = Standard Periodic 001 = Dual Periodic 010 = Inactivity Based 011 = Packet Count Based 100 = Byte Count Based 101-111 - Reserved for future |
| If (CQICH_MODE==000) { | | Standard Periodic |

TABLE 95-continued

CQICH_Control IE format

| Syntax | Size(bits) | Notes |
|---|---|---|
| Period (p) | 2 | A CQI feedback is transmitted on the CQI channels indexed by the (CQI Channel Index) by the MS in every 2p frames. |
| Frame offset | 3 | The MS starts reporting at the frame of which the number has the same 3 LSB as the specified frame offset. If the current frame is specified, the MS should start reporting in 8 frames. |
| Duration (d) | 4 | A CQI feedback is transmitted on the CQI channels indexed by the (CQI Channel Index) by the MS for 2(dI) frames. If d is 0b1111, the MS should report until the BS commands the MS to stop. |
| } | — | — |
| If (CQICH_MODE==001) { | | Dual Periodic |

TABLE 95-continued

CQICH_Control IE format

| Syntax | Size(bits) | Notes |
|---|---|---|
| Period During Gating Mode On (=p) | 3 | A CQI feedback is transmitted on the CQICH every 2^p frames while gating mode on |
| CQI Feedback Duration during Gating Mode On Duration after initiation point (=B) | 3 | While in Gating Mode on, A CQI feedback is transmitted on the CQI channels indexed by the CQICH_ID for (B+1) × 2^p frames. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 3 | This is the number of Frames between the Initiation Points (instants when MSS and infrastructure must enter Gating Mode On). This is measured in frames - the period is 2^p × (B+1) × 2^(D+1). |
| Gating Mode Duration (=d) | 3 | This is the duration for which the gating mode is considered on - If d== 000, the CQICH is deallocated. If d == 111, the MS should report until the BS command for the MS to stop, else the duration is 2^p × (B+1) × 2^(D+1) × 2^(d+1). |
| } | | |
| If (CQICH_MODE==010) { | | Inactivity Based |
| Period During Gating Mode On (=p) | 3 | A CQI feedback is transmitted on the CQICH every 2^p frames while gating mode on |
| Inactivity Duration during Gating Mode On Duration (=B) | 3 | While in Gating Mode on, if there is no activity for 2^p × (B+1) frames, then the CQICH is not transmitted till the next Gating Mode initiation period. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 3 | This is the number of Frames between the Initiation Points (instants when MSS and infrastructure must enter Gating Mode On). This is measured in frames - the period is 2^p × 2^(D+1). |

TABLE 95-continued

CQICH_Control IE format

| Syntax | Size(bits) | Notes |
|---|---|---|
| Gating Mode Duration (=d) | 3 | This is the duration for which the gating mode is considered on - If d== 000, the CQICH is deallocated. If d == 111, the MS should report until the BS command for the MS to stop, else the duration is 2^p × 2^(D+1) × 2^(d+1). |
| } | | |
| If (CQICH_MODE==011) { | | Packet Count based |
| Period During Gating Mode On (=p) | 3 | A CQI feedback is transmitted on the CQICH every 2^p frames while gating mode on |
| Packet Count during Gating Mode On (=B) | 5 | A CQI feedback is transmitted on the CQICH periodically (with period p) until B packets are received or the durations D and/or d elapse. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 5 | This is the number of Frames between the Initiation Points (instants when MSS and infrastructure must enter Gating Mode On). This is measured in frames - the period is 2^p × 2^(D+1) frames. |
| Gating Mode Duration (=d) | 3 | This is the duration for which the gating mode is considered on - If d== 000, the CQICH is deallocated. If d == 111, the MS should report until the BS command for the MS to stop, else the duration is 2^p × 2^(D+1) × 2^d. |
| Cumulative Mode | 1 | Cumulative setting. This parameter is relevant in the case where the required number of packets is not received before the end of the Gating Mode Period. In this case, if cumulative is equal to true, then the MSS does not enter Channel quality feedback DTX mode until it receives the packets not yet received from the prior Gating Mode Period(s) in addition to the packets for this current Gating Mode Period. |

TABLE 95-continued

CQICH_Control IE format

| Syntax | Size(bits) | Notes |
|---|---|---|
| | | In this case, if cumulative is equal to false, then the MSS enters Channel quality feedback DTX mode as soon as it receives the packets for the current Gating Mode Period. In other words, it ignores any packets which were not received during prior Gating Mode Period(s). |
| } | | |
| If (CQICH_MODE==100) { | | |
| Packet Size Indicator (=P) | 3 | Byte Count based 10*2^P bytes constitute a packet |
| Period During Gating Mode On (=p) | 3 | A CQI feedback is transmitted on the CQICH every 2^p frames while gating mode on |
| Packet Count during Gating Mode On (=B) | 5 | A CQI feedback is transmitted on the CQICH periodically (with period p) until B packets are received or the durations D and/or d elapse. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 5 | This is the number of Frames between the Initiation Points (instants when MSS and infrastructure must enter Gating Mode On). This is measured in frames - the period is 2^p × 2^(D+1). |
| Gating Mode Duration (=d) | 3 | This is the duration for which the gating mode is considered on - If d== 000, the CQICH is deallocated. If d == 111, the MS should report until the BS command for the MS to stop, else the duration is 2^p × 2^(D+1) × 2^d. |
| Cumulative Mode | 1 | Cumulative setting. This parameter is relevant in the case where the require number of packets is not received before the end of the Gating Mode Period. In this case, if cumulative is equal to true, then the MSS does not enter Channel quality feedback DTX mode until it receives the packets not yet received from the prior Gating Mode Period(s) in addition to the packets for this current Gating Mode Period. In this case, if cumulative is equal to false, then the MSS enters Channel quality feedback DTX mode as soon as it receives the packets for the current Gating Mode Period. In other words, it ignores any packets which were not received during prior Gating Mode Period(s). |
| } | | |
| } else { | — | — |
| reserved CQI reporting threshold | 3 | Shall be set to zero. A threshold used by an MS to report its CINR using CQI channel; If 0b000, this threshold is neglected. |
| } | — | — |
| } | — | — |

6.3.2.3.51 BS HO Request (MOB_BSHO-REQ) message

TABLE 108k

MOB_BSHO-REQ message format

| Syntax | Size(bits) | Notes |
|---|---|---|
| MOB_BSHO-REQ_Message_Format( ) { | — | — |
| . . . | | |
| CQICH_ID | variable | Index to uniquely identify he CQICH resource assigned to the MS after the MS switched to the new anchor BS Feedback channel offset 6 Index to the fast feedback channel region of the new Anchor BS marked by UIUC = 0 |
| CQICH_MODE | 3 | 000 = Standard Periodic<br>001 = Dual Periodic |

TABLE 108k-continued

MOB_BSHO-REQ message format

| Syntax | Size(bits) | Notes |
|---|---|---|
| | | 010 = Inactivity Based<br>011 = Packet Count Based<br>100 = Byte Count Based<br>101-111 - Reserved for future |
| If (CQICH_MODE==000) { | | Standard Periodic |
| Period (=p) | 2 | A CQI feedback is transmitted on the CQICH every 2p frames |
| Frame offset | 3 | The MS starts reporting at the frame of which the number has the same 3 LSB as the specified frame offset. If the current frame is specified, the MS should start reporting in 8 frames |
| Duration (=d) | 3 | A CQI feedback is transmitted on the CQI channels indexed by the CQICH_ID for 10x2d frames. If d == 0b000, the CQI-CH is deallocated.<br>If d == 0b111, the MS should report until the BS command for the MS to stop<br>MIMO_permutation_feedback_cycle 2 0b00 = No MIMO and permutation mode feedback 0b01 = the MIMO and permutation mode indication shall be transmitted on the CQICH indexed by the CQICH_ID every 4 frames. The first indication is sent on the 8th CQICH frame.<br>0b10 = the MIMO mode and permulation mode indication shall be transmitted on the CQICH indexed by the CQICH_ID every 8 frames. The first indication is sent on the 8th CQICH frame. 0b11 = the MIMO mode and permulation mode indication shall be transmitted on the CQICH indexed by the CQICH_ID every 16 frames. The first indication is sent on the 16th CQICH frame |
| } | — | — |
| If (CQICH_MODE==001) { | | Dual Periodic |
| Period During Gating Mode On (=p) | 3 | A CQI feedback is transmitted on the CQICH every 2^p frames while gating mode on |
| CQI Feedback Duration during Gating Mode On Duration after initiation point (=B) | 3 | While in Gating Mode on, A CQI feedback is transmitted on the CQI channels indexed by the CQICH_ID for (B+1) × 2^p frames. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 3 | This is the number of Frames between the Initiation Points (instants when MSS and infrastructure must enter Gating Mode On).<br>This is measured in frames - the period is 2^p × (B+1) × 2^(D+1). |
| Gating Mode Duration (=d) | 3 | This is the duration for which the gating mode is considered on - If d== 000, the CQICH is deallocated.<br>If d == 111, the MS should report until the BS command for the MS to stop, else the duration is 2^p × (B+1) × 2^(D+1) × 2^(d+1). |
| } | | |
| If (CQICH_MODE==010) { | | Inactivity Based |
| Period During Gating Mode On (=p) | 3 | A CQI feedback is transmitted on the CQICH every 2^p frames while gating mode on |

TABLE 108k-continued

MOB_BSHO-REQ message format

| Syntax | Size(bits) | Notes |
|---|---|---|
| Inactivity Duration during Gating Mode On Duration (=B) | 3 | While in Gating Mode on, if there is no activity for 2^p × (B+1) frames, then the CQICH is not transmitted till the next Gating Mode initiation period. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 3 | This is the number of Frames between the Initiation Points (instants when MSS and infrastructure must enter Gating Mode On). This is measured in frames - the period is 2^p × 2^(D+1). |
| Gating Mode Duration (=d) | 3 | This is the duration for which the gating mode is considered on - If d== 000, the CQICH is deallocated. If d == 111, the MS should report until the BS command for the MS to stop, else the duration is 2^p × 2^(D+1) × 2^(d+1). |
| } | | |
| If (CQICH_MODE==011) { | | Packet Count based |
| Period During Gating Mode On (=p) | 3 | A CQI feedback is transmitted on the CQICH every 2^p frames while gating mode on |
| Packet Count during Gating Mode On (=B) | 5 | A CQI feedback is transmitted on the CQICH periodically (with period p) until B packets are received or the durations D and/or d elapse. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 5 | This is the number of Frames between the Initiation Points (instants when MSS and infrastructure must enter Gating Mode On). This is measured in frames - the period is 2^p × 2^(D+1) frames. |
| Gating Mode Duration (=d) | 3 | This is the duration for which the gating mode is considered on - If d== 000, the CQICH is deallocated. If d == 111, the MS should report until the BS command for the MS to stop, else the duration is 2^p × 2^(D+1) × 2^d. |
| Cumulative Mode | 1 | Cumulative setting. This parameter is relevant in the case where the required number of packets is not received before the end of the Gating Mode Period. In this case, if cumulative is equal to true, then the MSS does not enter Channel quality feedback DTX mode until it receives the packets not yet received from the prior Gating Mode Period(s) in addition to the packets for this current Gating Mode Period. In this case, if cumulative is equal to false, then the MSS enters Channel quality feedback DTX mode as soon as it receives the packets for the current Gating Mode Period. In other words, it ignores any packets which were not received during prior Gating Mode Period(s). |
| } | | |

TABLE 108k-continued

MOB_BSHO-REQ message format

| Syntax | Size(bits) | Notes |
|---|---|---|
| If (CQICH_MODE==100) { | | Byte Count based |
| Packet Size Indicator (=P) | 3 | 10*2^P bytes constitute a packet |
| Period During Gating Mode On (=P) | 3 | A CQI feedback is transmitted on the CQICH every 2^p frames while gating mode on |
| Packet Count during Gating Mode On (=B) | 5 | A CQI feedback is transmitted on the CQICH periodically (with period p) until B packets are received or the durations D and/or d elapse. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 5 | This is the number of Frames between the Initiation Points (instants when MSS and infrastructure must enter Gating Mode On). This is measured in frames - the period is 2^p × 2^(D+1). |
| Gating Mode Duration (=d) | 3 | This is the duration for which the gating mode is considered on - If d== 000, the CQICH is deallocated. If d == 111, the MS should report until the BS command for the MS to stop, else the duration is 2^p × 2^(D+1) × 2^d. |
| Cumulative Mode | 1 | Cumulative setting. This parameter is relevant in the case where the require number of packets is not received before the end of the Gating Mode Period. In this case, if cumulative is equal to true, then the MSS does not enter Channel quality feedback DTX mode until it receives the packets not yet received from the prior Gating Mode Period(s) in addition to the packets for this current Gating Mode Period. In this case, if cumulative is equal to false, then the MSS enters Channel quality feedback DTX mode as soon as it receives the packets for the current Gating Mode Period. In other words, it ignores any packets which were not received during prior Gating Mode Period(s). |
| } | | |
| } | — | — |
| . . . | | |

6.3.2.3.53 BS HO Response (MOB_BSHO-RSP) message

TABLE 108m

MOB_BSHO-RSP message format

| Syntax | Size(bits) | Notes |
|---|---|---|
| MOB-_BSHO-RSP_Message_Format( ) { | — | — |
| . . . | | |
| CQICH_ID | variable | Index to uniquely identify he CQICH resource assigned to the MS after the MS switched to the new anchor BS |
| Feedback channel offset | 6 | Index to the fast feedback channel region of the new Anchor BS marked by UIUC=0 |

TABLE 108m-continued

MOB_BSHO-RSP message format

| Syntax | Size(bits) | Notes |
|---|---|---|
| CQICH_MODE | 3 | 000 = Standard Periodic<br>001 = Dual Periodic<br>010 = Inactivity Based<br>011 = Packet Count Based<br>100 = Byte Count Based<br>101-111 - Reserved for future |
| If (CQICH_MODE==000) { | | Standard Periodic |
| Period (=p) | 2 | A CQI feedback is transmitted on the CQICH every 2p frames |
| Frame offset | 3 | The MS starts reporting at the frame of which the number has the same 3 LSB as the specified frame offset. If the current frame is specified, the MS should start reporting in 8 frames |
| Duration (=d) | 3 | A CQI feedback is transmitted on the CQI channels indexed by the CQICH_ID for 10 × 2d frames. If d == 0b000, the CQI-CH is deallocated.<br>If d == 0b111, the MS should report until the BS command for the MS to stop<br>MIMO_permutation_feedback_cycle<br>2 0b000 = No MIMO and permutation mode feedback 0b01 = the MIMO and permutation mode indication shall be transmitted on the CQICH indexed by the CQICH_ID every 4 frames. The first indication is sent on the 8th CQICH frame.<br>0b10 = the MIMO mode and permulation mode indication shall be transmitted on the CQICH indexed by the CQICH_ID every 8 frames. The first indication is sent on the 8th CQICH frame. 0b11 = the MIMO mode and permulation mode indication shall be transmitted on the CQICH indexed by the CQICH_ID every 16 frames. The first indication is sent on the 16th CQICH frame |
| } | — | — |
| If (CQICH_MODE==001) { | | Dual Periodic |
| Period During Gating Mode On (=p) | 3 | A CQI feedback is transmitted on the CQICH every 2^p frames while gating mode on |
| CQI Feedback Duration during Gating Mode On Duration after initiation point (=B) | 3 | While in Gating Mode on, A CQI feedback is transmitted on the CQI channels indexed by the CQICH_ID for (B+1) × 2^p frames. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 3 | This is the number of Frames between the Initiation Points (instants when MSS and infrastructure must enter Gating Mode On).<br>This is measured in frames - the period is 2^p × (B+1) × 2^(D+1). |
| Gating Mode Duration (=d) | 3 | This is the duration for which the gating mode is considered on - If d== 000, the CQICH is deallocated.<br>If d == 111, the MS should report until the BS command for the MS to stop, else the duration is 2^p × (B+1) × 2^(D+1) × 2^(d+1). |
| } | | |
| If (CQICH_MODE==010) { | | Inactivity Based |
| Period During Gating Mode On (=p) | 3 | A CQI feedback is transmitted on the CQICH every 2^p frames while gating mode on |

TABLE 108m-continued

MOB_BSHO-RSP message format

| Syntax | Size(bits) | Notes |
|---|---|---|
| Inactivity Duration during Gating Mode On Duration (=B) | 3 | While in Gating Mode on, if there is no activity for 2^p × (B+1) frames, then the CQICH is not transmitted till the next Gating Mode initiation period. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 3 | This is the number of Frames between the Initiation Points (instants when MSS and infrastructure must enter Gating Mode On). This is measured in frames - the period is 2^p × 2^(D+1). |
| Gating Mode Duration (=d) | 3 | This is the duration for which the gating mode is considered on - If d== 000, the CQICH is deallocated. If d == 111, the MS should report until the BS command for the MS to stop, else the duration is 2^p × 2^(D+1) × 2^(d+1). |
| } | | |
| If (CQICH_MODE==011) { | | Packet Count based |
| Period During Gating Mode On (=p) | 3 | A CQI feedback is transmitted on the CQICH every 2^p frames while gating mode on |
| Packet Count during Gating Mode On (=B) | 5 | A CQI feedback is transmitted on the CQICH periodically (with period p) until B packets are received or the durations D and/or d elapse. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 5 | This is the number of Frames between the Initiation Points (instants when MSS and infrastructure must enter Gating Mode On). This is measured in frames - the period is 2^p × 2^(D+1) frames. |
| Gating Mode Duration (=d) | 3 | This is the duration for which the gating mode is considered on - If d== 000, the CQICH is deallocated. If d == 111, the MS should report until the BS command for the MS to stop, else the duration is 2^p × 2^(D+1) × 2^d. |
| Cumulative Mode | 1 | Cumulative setting. This parameter is relevant in the case where the required number of packets is not received before the end of the Gating Mode Period. In this case, if cumulative is equal to true, then the MSS does not enter Channel quality feedback DTX mode until it receives the packets not yet received from the prior Gating Mode Period(s) in addition to the packets for this current Gating Mode Period. In this case, if cumulative is equal to false, then the MSS enters Channel quality feedback DTX mode as soon as it receives the packets for the current Gating Mode Period. In other words, it ignores any packets which were not received during prior Gating Mode Period(s). |
| } | | |

TABLE 108m-continued

MOB_BSHO-RSP message format

| Syntax | Size(bits) | Notes |
|---|---|---|
| If (CQICH_MODE==100) { | | Byte Count based |
| Packet Size Indicator (=P) | 3 | 10*2^P bytes constitute a packet |
| Period During Gating Mode On (=p) | 3 | A CQI feedback is transmitted on the CQICH every 2^p frames while gating mode on |
| Packet Count during Gating Mode On (=B) | 5 | A CQI feedback is transmitted on the CQICH periodically (with period p) until B packets are received or the durations D and/or d elapse. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 5 | This is the number of Frames between the Initiation Points (instants when MSS and infrastructure must enter Gating Mode On). This is measured in frames - the period is 2^p × 2^(D+1). |
| Gating Mode Duration (=d) | 3 | This is the duration for which the gating mode is considered on - If d== 000, the CQICH is deallocated. If d == 111, the MS should report until the BS command for the MS to stop, else the duration is 2^p × 2^(D+1) × 2^d. |
| Cumulative Mode | 1 | Cumulative setting. This parameter is relevant in the case where the require number of packets is not received before the end of the Gating Mode Period. In this case, if cumulative is equal to true, then the MSS does not enter Channel quality feedback DTX mode until it receives the packets not yet received from the prior Gating Mode Period(s) in addition to the packets for this current Gating Mode Period. In this case, if cumulative is equal to false, then the MSS enters Channel quality feedback DTX mode as soon as it receives the packets for the current Gating Mode Period. In other words, it ignores any packets which were not received during prior Gating Mode Period(s). |
| } | | |
| } | — | — |
| If (CQICH_MODE==001) { | | Dual Periodic |
| Period During Gating Mode On (=p) | 3 | A CQI feedback is transmitted on the CQICH every 2^p frames while gating mode on |
| CQI Feedback Duration during Gating Mode On Duration after initiation point (=B) | 3 | While in Gating Mode on, A CQI feedback is transmitted on the CQI channels indexed by the CQICH_ID for (B+1) × 2^p frames. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 3 | This is the number of Frames between the Initiation Points (instants when MSS and infrastructure must enter Gating Mode On). This is measured in frames - the period is 2^p × (B+1) × 2^(D+1). |
| Gating Mode Duration (=d) | 3 | This is the duration for which the gating mode is considered on - If d== 000, the CQICH is deallocated. |

TABLE 108m-continued

MOB_BSHO-RSP message format

| Syntax | Size(bits) | Notes |
|---|---|---|
| | | If d == 111, the MS should report until the BS command for the MS to stop, else the duration is 2^p × (B+1) × 2^(D+1) × 2^(d+1). |
| } | | |
| If (CQICH_MODE==010) { | | Inactivity Based |
| Period During Gating Mode On (=p) | 3 | A CQI feedback is transmitted on the CQICH every 2^p frames while gating mode on |
| Inactivity Duration during Gating Mode On Duration (=B) | 3 | While in Gating Mode on, if there is no activity for 2^p × (B+1) frames, then the CQICH is not transmitted till the next Gating Mode initiation period. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 3 | This is the number of Frames between the Initiation Points (instants when MSS and infrastructure must enter Gating Mode On). This is measured in frames - the period is 2^p × 2^(D+1). |
| Gating Mode Duration (=d) | 3 | This is the duration for which the gating mode is considered on - If d== 000, the CQICH is deallocated. If d == 111, the MS should report until the BS command for the MS to stop, else the duration is 2^p × 2^(D+1) × 2^(d+1). |
| } | | |
| If (CQICH_MODE==011) { | | Packet Count based |
| Period During Gating Mode On (=p) | 3 | A CQI feedback is transmitted on the CQICH every 2^p frames while gating mode on |
| Packet Count during Gating Mode On (=B) | 5 | A CQI feedback is transmitted on the CQICH periodically (with period p) until B packets are received or the durations D and/or d elapse. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 5 | This is the number of Frames between the Initiation Points (instants when MSS and infrastructure must enter Gating Mode On). This is measured in frames - the period is 2^p × 2^(D+1) frames. |
| Gating Mode Duration (=d) | 3 | This is the duration for which the gating mode is considered on - If d== 000, the CQICH is deallocated. If d == 111, the MS should report until the BS command for the MS to stop, else the duration is 2^p × 2^(D+1) × 2^d. |
| Cumulative Mode | 1 | Cumulative setting. This parameter is relevant in the case where the required number of packets is not received before the end of the Gating Mode Period. In this case, if cumulative is equal to true, then the MSS does not enter Channel quality feedback DTX mode until it receives the packets not yet received from the prior Gating Mode Period(s) in addition to the packets for this current Gating Mode Period. In this case, if cumulative is equal to false, then the MSS enters |

TABLE 108m-continued

MOB_BSHO-RSP message format

| Syntax | Size(bits) | Notes |
|---|---|---|
| | | Channel quality feedback DTX mode as soon as it receives the packets for the current Gating Mode Period. In other words, it ignores any packets which were not received during prior Gating Mode Period(s). |
| } | | |
| If (CQICH_MODE==100) { | | Byte Count based |
| Packet Size Indicator (=P) | 3 | 10*2^P bytes constitute a packet |
| Period During Gating Mode On (=p) | 3 | A CQI feedback is transmitted on the CQICH every 2^p frames while gating mode on |
| Packet Count during Gating Mode On (=B) | 5 | A CQI feedback is transmitted on the CQICH periodically (with period p) until B packets are received or the durations D and/or d elapse. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 5 | This is the number of Frames between the Initiation Points (instants when MSS and infrastructure must enter Gating Mode On). This is measured in frames - the period is 2^p × 2^(D+1). |
| Gating Mode Duration (=d) | 3 | This is the duration for which the gating mode is considered on - If d== 000, the CQICH is deallocated. If d == 111, the MS should report until the BS command for the MS to stop, else the duration is 2^p × 2^(D+1) × 2^d. |
| Cumulative Mode | 1 | Cumulative setting. This parameter is relevant in the case where the require number of packets is not received before the end of the Gating Mode Period. In this case, if cumulative is equal to true, then the MSS does not enter Channel quality feedback DTX mode until it receives the packets not yet received from the prior Gating Mode Period(s) in addition to the packets for this current Gating Mode Period. In this case, if cumulative is equal to false, then the MSS enters Channel quality feedback DTX mode as soon as it receives the packets for the current Gating Mode Period. In other words, it ignores any packets which were not received during prior Gating Mode Period(s). |
| } | | |
| } | — | — |
| If (CQICH_MODE==001) { | | Dual Periodic |
| Period During Gating Mode On (=p) | 3 | A CQI feedback is transmitted on the CQICH every 2^p frames while gating mode on |
| CQI Feedback Duration during Gating Mode On Duration after initiation point (=B) | 3 | While in Gating Mode on, A CQI feedback is transmitted on the CQI channels indexed by the CQICH_ID for (B+1) × 2^p frames. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 3 | This is the number of Frames between the Initiation Points (instants when MSS and |

TABLE 108m-continued

MOB_BSHO-RSP message format

| Syntax | Size(bits) | Notes |
|---|---|---|
| | | infrastructure must enter Gating Mode On). This is measured in frames - the period is 2^p × (B+1) × 2^(D+1). |
| Gating Mode Duration (=d) | 3 | This is the duration for which the gating mode is considered on - If d== 000, the CQICH is deallocated. If d == 111, the MS should report until the BS command for the MS to stop, else the duration is 2^p × (B+1) × 2^(D+1) × 2^(d+1). |
| } | | |
| If (CQICH_MODE==010) { | | Inactivity Based |
| Period During Gating Mode On (=p) | 3 | A CQI feedback is transmitted on the CQICH every 2^p frames while gating mode on |
| Inactivity Duration during Gating Mode On Duration (=B) | 3 | While in Gating Mode on, if there is no activity for 2^p × (B+1) frames, then the CQICH is not transmitted till the next Gating Mode initiation period. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 3 | This is the number of Frames between the Initiation Points (instants when MSS and infrastructure must enter Gating Mode On). This is measured in frames - the period is 2^p × 2^(D+1). |
| Gating Mode Duration (=d) | 3 | This is the duration for which the gating mode is considered on - If d== 000, the CQICH is deallocated. If d == 111, the MS should report until the BS command for the MS to stop, else the duration is 2^p × 2^(D+1) × 2^(d+1). |
| } | | |
| If (CQICH_MODE==011) { | | Packet Count based |
| Period During Gating Mode On (=p) | 3 | A CQI feedback is transmitted on the CQICH every 2^p frames while gating mode on |
| Packet Count during Gating Mode On (=B) | 5 | A CQI feedback is transmitted on the CQICH periodically (with period p) until B packets are received or the durations D and/or d elapse. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 5 | This is the number of Frames between the Initiation Points (instants when MSS and infrastructure must enter Gating Mode On). This is measured in frames - the period is 2^p × 2^(D+1) frames. |
| Gating Mode Duration (=d) | 3 | This is the duration for which the gating mode is considered on - If d== 000, the CQICH is deallocated. If d == 111, the MS should report until the BS command for the MS to stop, else the duration is 2^p × 2^(D+1) × 2^d. |
| Cumulative Mode | 1 | Cumulative setting. This parameter is relevant in the case where the required number of packets is not received before the end of the Gating Mode Period. In this case, if cumulative is equal to true, then the MSS does not enter Channel quality feedback DTX |

TABLE 108m-continued

MOB_BSHO-RSP message format

| Syntax | Size(bits) | Notes |
|---|---|---|
| | | mode until it receives the packets not yet received from the prior Gating Mode Period(s) in addition to the packets for this current Gating Mode Period. In this case, if cumulative is equal to false, then the MSS enters Channel quality feedback DTX mode as soon as it receives the packets for the current Gating Mode Period. In other words, it ignores any packets which were not received during prior Gating Mode Period(s). |
| } | | |
| If (CQICH_MODE==100) { | | Byte Count based |
| Packet Size Indicator (=P) | 3 | 10*2^P bytes constitute a packet |
| Period During Gating Mode On (=p) | 3 | A CQI feedback is transmitted on the CQICH every 2^p frames while gating mode on |
| Packet Count during Gating Mode On (=B) | 5 | A CQI feedback is transmitted on the CQICH periodically (with period p) until B packets are received or the durations D and/or d elapse. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 5 | This is the number of Frames between the Initiation Points (instants when MSS and infrastructure must enter Gating Mode On). This is measured in frames - the period is 2^p × 2^(D+1). |
| Gating Mode Duration (=d) | 3 | This is the duration for which the gating mode is considered on - If d== 000, the CQICH is deallocated. If d == 111, the MS should report until the BS command for the MS to stop, else the duration is 2^p × 2^(D+1) × 2^d. |
| Cumulative Mode | 1 | Cumulative setting. This parameter is relevant in the case where the require number of packets is not received before the end of the Gating Mode Period. In this case, if cumulative is equal to true, then the MSS does not enter Channel quality feedback DTX mode until it receives the packets not yet received from the prior Gating Mode Period(s) in addition to the packets for this current Gating Mode Period. In this case, if cumulative is equal to false, then the MSS enters Channel quality feedback DTX mode as soon as it receives the packets for the current Gating Mode Period. In other words, it ignores any packets which were not received during prior Gating Mode Period(s). |
| } | | |
| } | — | — |
| . . . | | |

8.4.5.3.27 MS_SDMA_DL_IE

TABLE 285u

AAS_SDMA_DL_IE

| Syntax | Size (bits) | Notes |
|---|---|---|
| AAS_SDMA_DL_IE( ){ | — | — |
| . . . | | |
| If (CQICH Allocation Included) { | — | — |
| Allocation Index | 6 | Index to the channel in a frame the CQI report should be transmitted by the SS |
| CQICH_MODE | 3 | 000 = Standard Periodic<br>001 = Dual Periodic<br>010 = Inactivity Based<br>011 = Packet Count Based<br>100 = Byte Count Based<br>101–111 - Reserved for future |
| If (CQICH_MODE==000) { | | Standard Periodic |
| Period (p) | 3 | A CQI feedback is transmitted on the CQI channels indexed by the (CQI Channel Index) by the SS in every 2p frames. |
| Frame offset | 3 | The MSS starts reporting at the frame of which the number has the same 3 LSB as the specified frame offset. If the current frame is specified, the MSS should start reporting in 8 frames. |
| Duration (d) | 4 | A CQI feedback is transmitted on the CQI channels indexed by the (CQI Channel Index) by the SS for 2(d−1) frames. If d is 0b0000, the CQICH is de-allocated. If d is 0b1111, the MSS should report until the BS command for the MSS to stop. |
| } | — | — |
| If (CQICH_MODE==001) { | | Dual Periodic |
| Period During Gating Mode On (=p) | 3 | A CQI feedback is transmitted on the CQICH every 2^p frames while gating mode on |
| CQI Feedback Duration during Gating Mode On Duration after initiation point (=B) | 3 | While in Gating Mode on, A CQI feedback is transmitted on the CQI channels indexed by the CQICH_ID for (B+1) × 2^p frames. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 3 | This is the number of Frames between the Initiation Points |

TABLE 285u-continued

AAS_SDMA_DL_IE

| Syntax | Size (bits) | Notes |
|---|---|---|
| | | (instants when MSS and infrastructure must enter Gating Mode On). This is measured in frames - the period is 2^p × (B+1) × 2^(D+1). |
| Gating Mode Duration (=d) | 3 | This is the duration for which the gating mode is considered on - If d== 000, the CQICH is deallocated. If d == 111, the MS should report until the BS command for the MS to stop, else the duration is 2^p × (B+1) × 2^(D+1) × 2^(d+1). |
| } | | |
| If (CQICH_MODE==010) { | | Inactivity Based |
| Period During Gating Mode On (=p) | 3 | A CQI feedback is transmitted on the CQICH every 2^p frames while gating mode on |
| Inactivity Duration during Gating Mode On Duration (=B) | 3 | While in Gating Mode on, if there is no activity for 2^p × (B+1) frames, then the CQICH is not transmitted till the next Gating Mode initiation period. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 3 | This is the number of Frames between the Initiation Points (instants when MSS and infrastructure must enter Gating Mode On). This is measured in frames - the period is 2^p × 2^(D+1). |
| Gating Mode Duration (=d) | 3 | This is the duration for which the gating mode is considered on - If d== 000, the CQICH is deallocated. If d == 111, the MS should report until the BS command for the MS to stop, else the duration is 2^p × 2^(D+1) × 2^(d+1). |
| } | | |
| If (CQICH_MODE==011) { | | Packet Count based |
| Period During Gating Mode On (=p) | 3 | A CQI feedback is transmitted on the CQICH every 2^p frames while gating mode on |
| Packet Count during Gating Mode On (=B) | 5 | A CQI feedback is transmitted on the CQICH periodically (with period p) until B packets are received |

TABLE 285u-continued

AAS_SDMA_DL_IE

| Syntax | Size (bits) | Notes |
|---|---|---|
| | | or the durations D and/or d elapse. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 5 | This is the number of Frames between the Initiation Points (instants when MSS and infrastructure must enter Gating Mode On). This is measured in frames - the period is 2^p × 2^(D+1) frames. |
| Gating Mode Duration (=d) | 3 | This is the duration for which the gating mode is considered on - If d== 000, the CQICH is deallocated. If d == 111, the MS should report until the BS command for the MS to stop, else the duration is 2^p × 2^(D+1) × 2^d. |
| Cumulative Mode | 1 | Cumulative setting. This parameter is relevant in the case where the required number of packets is not received before the end of the Gating Mode Period. In this case, if cumulative is equal to true, then the MSS does not enter Channel quality feedback DTX mode until it receives the packets not yet received from the prior Gating Mode Period(s) in addition to the packets for this current Gating Mode Period. In this case, if cumulative is equal to false, then the MSS enters Channel quality feedback DTX mode as soon as it receives the packets for the current Gating Mode Period. In other words, it ignores any packets which were not received during prior Gating Mode Period(s). |
| } | | |
| If (CQICH_MODE==100) { | | Byte Count based |
| Packet Size Indicator (=P) | 3 | 10*2^P bytes constitute a packet |
| Period During Gating Mode On (=p) | 3 | A CQI feedback is transmitted on the |

TABLE 285u-continued

AAS_SDMA_DL_IE

| Syntax | Size (bits) | Notes |
|---|---|---|
| | | CQICH every 2^p frames while gating mode on |
| Packet Count during Gating Mode On (=B) | 5 | A CQI feedback is transmitted on the CQICH periodically (with period p) until B packets are received or the durations D and/or d elapse. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 5 | This is the number of Frames between the Initiation Points (instants when MSS and infrastructure must enter Gating Mode On). This is measured in frames - the period is 2^p × 2^(D+1). |
| Gating Mode Duration (=d) | 3 | This is the duration for which the gating mode is considered on - If d== 000, the CQICH is deallocated. If d == 111, the MS should report until the BS command for the MS to stop, else the duration is 2^p × 2^(D+1) × 2^d. |
| Cumulative Mode | 1 | Cumulative setting. This parameter is relevant in the case where the require number of packets is not received before the end of the Gating Mode Period. In this case, if cumulative is equal to true, then the MSS does not enter Channel quality feedback DTX mode until it receives the packets not yet received from the prior Gating Mode Period(s) in addition to the packets for this current Gating Mode Period. In this case, if cumulative is equal to false, then the MSS enters Channel quality feedback DTX mode as soon as it receives the packets for the current Gating Mode Period. In other words, it ignores any packets which were not received during |

TABLE 285u-continued

AAS_SDMA_DL_IE

| Syntax | Size (bits) | Notes |
|---|---|---|
| | | prior Gating Mode Period(s). |
| } | | |
| } | — | — |
| If (CQICH_MODE==001) { | | Dual Periodic |
| Period During Gating Mode On (=p) | 3 | A CQI feedback is transmitted on the CQICH every 2^p frames while gating mode on |
| CQI Feedback Duration during Gating Mode On Duration after initiation point (=B) | 3 | While in Gating Mode on, A CQI feedback is transmitted on the CQI channels indexed by the CQICH_ID for (B+1) × 2^p frames. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 3 | This is the number of Frames between the Initiation Points (instants when MSS and infrastructure must enter Gating Mode On). This is measured in frames - the period is 2^p × (B+1) × 2^(D+1). |
| Gating Mode Duration (=d) | 3 | This is the duration for which the gating mode is considered on - If d== 000, the CQICH is deallocated. If d == 111, the MS should report until the BS command for the MS to stop, else the duration is 2^p × (B+1) × 2^(D+1) × 2^(d+1). |
| } | | |
| If (CQICH_MODE==010) { | | Inactivity Based |
| Period During Gating Mode On (=p) | 3 | A CQI feedback is transmitted on the CQICH every 2^p frames while gating mode on |
| Inactivity Duration during Gating Mode On Duration (=B) | 3 | While in Gating Mode on, if there is no activity for 2^p × (B+1) frames, then the CQICH is not transmitted till the next Gating Mode initiation period. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 3 | This is the number of Frames between the Initiation Points (instants when MSS and infrastructure |

TABLE 285u-continued

AAS_SDMA_DL_IE

| Syntax | Size (bits) | Notes |
|---|---|---|
| | | must enter Gating Mode On). This is measured in frames - the period is 2^p × 2^(D+1). |
| Gating Mode Duration (=d) | 3 | This is the duration for which the gating mode is considered on - If d== 000, the CQICH is deallocated. If d == 111, the MS should report until the BS command for the MS to stop, else the duration is 2^p × 2^(D+1) × 2^(d+1). |
| } | | |
| If (CQICH_MODE==011) { | | Packet Count based |
| Period During Gating Mode On (=p) | 3 | A CQI feedback is transmitted on the CQICH every 2^p frames while gating mode on |
| Packet Count during Gating Mode On (=B) | 5 | A CQI feedback is transmitted on the CQICH periodically (with period p) until B packets are received or the durations D and/or d elapse. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 5 | This is the number of Frames between the Initiation Points (instants when MSS and infrastructure must enter Gating Mode On). This is measured in frames - the period is 2^p × 2^(D+1) frames. |
| Gating Mode Duration (=d) | 3 | This is the duration for which the gating mode is considered on - If d== 000, the CQICH is deallocated. If d == 111, the MS should report until the BS command for the MS to stop, else the duration is 2^p × 2^(D+1) × 2^d. |
| Cumulative Mode | 1 | Cumulative setting. This parameter is relevant in the case where the required number of packets is not received before the end of the Gating Mode Period. In this case, if cumulative is equal to true, then the MSS does not enter Channel quality feedback DTX mode |

TABLE 285u-continued

AAS_SDMA_DL_IE

| Syntax | Size (bits) | Notes |
|---|---|---|
| | | until it receives the packets not yet received from the prior Gating Mode Period(s) in addition to the packets for this current Gating Mode Period. In this case, if cumulative is equal to false, then the MSS enters Channel quality feedback DTX mode as soon as it receives the packets for the current Gating Mode Period. In other words, it ignores any packets which were not received during prior Gating Mode Period(s). |
| } | | |
| If (CQICH_MODE==100) { | | Byte Count based |
| Packet Size Indicator (=P) | 3 | 10*2^P bytes constitute a packet |
| Period During Gating Mode On (=p) | 3 | A CQI feedback is transmitted on the CQICH every 2^p frames while gating mode on |
| Packet Count during Gating Mode On (=B) | 5 | A CQI feedback is transmitted on the CQICH periodically (with period p) until B packets are received or the durations D and/or d elapse. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 5 | This is the number of Frames between the Initiation Points (instants when MSS and infrastructure must enter Gating Mode On). This is measured in frames - the period is 2^p × 2^(D+1). |
| Gating Mode Duration (=d) | 3 | This is the duration for which the gating mode is considered on- If d== 000, the CQICH is deallocated. If d == 111, the MS should report until the BS command for the MS to stop, else the duration is 2^p × 2^(D+1) × 2^d. |
| Cumulative Mode | 1 | Cumulative setting. This parameter is relevant in the case where the require number of packets is not received before the end of the Gating |

TABLE 285u-continued

| AAS_SDMA_DL_IE | | |
|---|---|---|
| Syntax | Size (bits) | Notes |
| | | Mode Period. In this case, if cumulative is equal to true, then the MSS does not enter Channel quality feedback DTX mode until it receives the packets not yet received from the prior Gating Mode Period(s) in addition to the packets for this current Gating Mode Period. In this case, if cumulative is equal to false, then the MSS enters Channel quality feedback DTX mode as soon as it receives the packets for the current Gating Mode Period. In other words, it ignores any packets which were not received during prior Gating Mode Period(s). |
| } | | |
| } | — | — |
| . . . | | |

8.4.5.4.23 Anchor BS Switch IE

TABLE 302j

| Anchor_BS_switch_IE format | | |
|---|---|---|
| Syntax | Size(bits) | Notes |
| Anchor_BS_switch_IE( ) { | — | — |
| . . . | | |
| If (CQICH_Allocation_Indicator == 1) { | — | — |
| CQICH_ID | variable | Index to uniquely identify the CQICH resource assigned to the MS after the MS switched to the new anchor BS |
| Feedback channel offset | 6 | Index to the Fast-feedback channel region of the new Anchor BS marked by UIUC=0 |
| CQICH_MODE | 3 | 000 = Standard Periodic<br>001 = Dual Periodic<br>010 = Inactivity Based<br>011 = Packet Count Based<br>100 = Byte Count Based<br>101–111 - Reserved for future |
| If (CQICH_MODE==000) { | | Standard Periodic |
| Period (=p) | 2 | A CQI feedback is transmitted on the CQICH every 2p frames. |
| Frame offset | 3 | The MS starts reporting at the frame of which the number has the same 3 LSB as the specified frame offset. If the current frame is specified, the MS should start reporting in 8 frames |
| Duration (=d) | 3 | A CQI feedback is transmitted on the CQI channels indexed by the CQICH_ID for 10 × 2d frames. If d ==0b000, |

TABLE 302j-continued

Anchor_BS_switch_IE format

| Syntax | Size(bits) | Notes |
|---|---|---|
| | | the CQI-CH is de-allocated. If d ==0b111, the MS should report until the BS command for the MS to stop. MIMO_permutation_feedback_cycle 2 0b00 = No MIMO and permutation mode feedback 0b01 = the MIMO and permutation mode indication shall be transmitted on the CQICH indexed by the CQICH_ID every 4 frames. The first indication is sent on the 8th CQICH frame. 0b10 = the MIMO mode and permultation mode indication shall be transmitted on the CQICH indexed by the CQICH_ID every 8 frames. The first indication is sent on the 8th CQICH frame. 0b11 = the MIMO mode and permultation mode indication shall be transmitted on the CQICH indexed by the CQICH_ID every 16 frames. The first indication is sent on the 16th CQICH frame. Reserved Variable Number of bits required to align to byte length from CQICH Allocation Indicator bit field, shall be set to zero. |
| } | — | — |
| If (CQICH_MODE==001) { | | Dual Periodic |
| Period During Gating Mode On (=p) | 3 | A CQI feedback is transmitted on the CQICH every 2^p frames while gating mode on |
| CQI Feedback Duration during Gating Mode On Duration after initiation point (=B) | 3 | While in Gating Mode on, A CQI feedback is transmitted on the CQI channels indexed by the CQICH_ID for (B+1) × 2^p frames. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 3 | This is the number of Frames between the Initiation Points (instants when MSS and infrastructure must enter Gating Mode On). This is measured in frames - the period is 2^p × (B+1) × 2^(D+1). |
| Gating Mode Duration (=d) | 3 | This is the duration for which the gating mode is considered on - If d== 000, the CQICH is deallocated. If d == 111, the MS should report until the BS command for the MS to stop, else the duration is 2^p × (B+1) × 2^(D+1) × 2^(d+1). |
| } | | |
| If (CQICH_MODE==010) { | | Inactivity Based |
| Period During Gating Mode On (=p) | 3 | A CQI feedback is transmitted on the CQICH every 2^p frames while gating mode on |
| Inactivity Duration during Gating Mode On Duration (=B) | 3 | While in Gating Mode on, if there is no activity for 2^p × (B+1) frames, then the CQICH is not transmitted till the next Gating Mode initiation period. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 3 | This is the number of Frames between the Initiation Points (instants when MSS and |

TABLE 302j-continued

Anchor_BS_switch_IE format

| Syntax | Size(bits) | Notes |
|---|---|---|
| | | infrastructure must enter Gating Mode On). This is measured in frames - the period is 2^p × 2^(D+1). |
| Gating Mode Duration (=d) | 3 | This is the duration for which the gating mode is considered on - If d== 000, the CQICH is deallocated. If d == 111, the MS should report until the BS command for the MS to stop, else the duration is 2^p × 2^(D+1) × 2^(d+1). |
| } | | |
| If (CQICH_MODE==011) { | | Packet Count based |
| Period During Gating Mode On (=p) | 3 | A CQI feedback is transmitted on the CQICH every 2^p frames while gating mode on |
| Packet Count during Gating Mode On (=B) | 5 | A CQI feedback is transmitted on the CQICH periodically (with period p) until B packets are received or the durations D and/or d elapse. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 5 | This is the number of Frames between the Initiation Points (instants when MSS and infrastructure must enter Gating Mode On). This is measured in frames - the period is 2^p × 2^(D+1) frames. |
| Gating Mode Duration (=d) | 3 | This is the duration for which the gating mode is considered on - If d== 000, the CQICH is deallocated. If d == 111, the MS should report until the BS command for the MS to stop, else the duration is 2^p × 2^(D+1) × 2^d. |
| Cumulative Mode | 1 | Cumulative setting. This parameter is relevant in the case where the required number of packets is not received before the end of the Gating Mode Period. In this case, if cumulative is equal to true, then the MSS does not enter Channel quality feedback DTX mode until it receives the packets not yet received from the prior Gating Mode Period(s) in addition to the packets for this current Gating Mode Period. In this case, if cumulative is equal to false, then the MSS enters Channel quality feedback DTX mode as soon as it receives the packets for the current Gating Mode Period. In other words, it ignores any packets which were not received during prior Gating Mode Period(s). |
| } | | |
| If (CQICH_MODE==100) { | | Byte Count based |
| Packet Size Indicator (=P) | 3 | 10*2^p bytes constitute a packet |
| Period During Gating Mode On (=p) | 3 | A CQI feedback is transmitted on the CQICH every 2^p frames while gating mode on |
| Packet Count during Gating Mode On (=B) | 5 | A CQI feedback is transmitted on the CQICH periodically (with period p) until B packets are received or the durations D and/or d elapse. |
| Frame offset | 3 | The MS starts reporting at the frame of which the number has the same 3 LSB as the specified frame offset. If the current frame is specified, the MS should start reporting in 8 frames |

TABLE 302j-continued

Anchor_BS_switch_IE format

| Syntax | Size(bits) | Notes |
|---|---|---|
| Period between gating Mode on initiation points (=D) | 5 | This is the number of Frames between the Initiation Points (instants when MSS and infrastructure must enter Gating Mode On). This is measured in frames - the period is 2^p × 2^(D+1). |
| Gating Mode Duration (=d) | 3 | This is the duration for which the gating mode is considered on - If d== 000, the CQICH is deallocated. If d == 111, the MS should report until the BS command for the MS to stop, else the duration is 2^p × 2^(D+1) × 2^d. |
| Cumulative Mode | 1 | Cumulative setting. This parameter is relevant in the case where the require number of packets is not received before the end of the Gating Mode Period. In this case, if cumulative is equal to true, then the MSS does not enter Channel quality feedback DTX mode until it receives the packets not yet received from the prior Gating Mode Period(s) in addition to the packets for this current Gating Mode Period. In this case, if cumulative is equal to false, then the MSS enters Channel quality feedback DTX mode as soon as it receives the packets for the current Gating Mode Period. In other words, it ignores any packets which were not received during prior Gating Mode Period(s). |
| } | | |
| } | — | — |
| . . . | | |

8.4.5.4.12 CQICH Allocation IE Format

TABLE 298

CQICH alloc IE format

| Syntax | Size | Notes |
|---|---|---|
| CQICH_Alloc_IE( ) ( ) { | — | — |
| Extended DIUC | 4 bits | CQICH = 0x03 |
| Length | 4 bits | Length of the message in bytes (variable) |
| CQICH_ID | variable | Index to uniquely identify the CQICH resource assigned to the SS The size of this field is dependent on system parameter defined in DCD. |
| Allocation offset | 6 bits | Index to the fast feedback channel region marked by UIUC = 0. |
| CQICH_MODE | 3 | 000 = Standard Periodic<br>001 = Dual Periodic<br>010 = Inactivity Based<br>011 = Packet Count Based<br>100 = Byte Count Based<br>101–111 - Reserved for future |
| If (CQICH_MODE==000) { | | Standard Periodic |
| Period (p) | 2 bits | A CQI feedback is transmitted on the CQICH every 2p frames. |
| Frame offset | 3 bits | The SS starts reporting at the frame of which the number has the same 3 LSB as the specified frame offset. If the current frame is specified, the SS should start reporting in 8 frames |

TABLE 298-continued

CQICH alloc IE format

| Syntax | Size | Notes |
|---|---|---|
| Duration (d) | 3 bits | A CQI feedback is transmitted on the CQI channels indexed by the CQICH_ID for 10 × 2d frames. If d == 0, the CQI-CH is deallocated. If d == 0b111, the SS should report until the BS command for the SS to stop. MIMO_permutation_feedback_cycle 2 bits 0b00 = No MIMO and permutation mode feedback 0b01 = The MIMO and permutation mode indication shall be transmitted on the CQICH indexed by the CQICH_ID every 4 frames. The first indication is sent on the 8th CQICH frame. 0b10 = The MIMO mode and permultation mode indication shall be transmitted on the CQICH indexed by the CQICH_ID every 8 frames. The first indication is sent on the 8th CQICH frame. 0b11 = The MIMO mode and permultation mode indication shall be transmitted on the CQICH indexed by the CQICH_ID every 16 frames. The first indication is sent on the 16th CQICH frame. |
| } | — | — |
| If (CQICH_MODE==001) { | | Dual Periodic |
| Period During Gating Mode On (=p) | 3 | A CQI feedback is transmitted on the CQICH every 2^p frames while gating mode on |
| CQI Feedback Duration during Gating Mode On Duration after initiation point (=B) | 3 | While in Gating Mode on, A CQI feedback is transmitted on the CQI channels indexed by the CQICH_ID for (B+1) × 2^p frames. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 3 | This is the number of Frames between the Initiation Points (instants when MSS and infrastructure must enter Gating Mode On). This is measured in frames - the period is 2^p × (B+1) × 2^(D+1). |
| Gating Mode Duration (=d) | 3 | This is the duration for which the gating mode is considered on - If d== 000, the CQICH is deallocated. If d == 111, the MS should report until the BS command for the MS to stop, else the duration is 2^p × (B+1) × 2^(D+1) × 2^(d+1). |
| } | | |
| If (CQICH_MODE==010) { | | Inactivity Based |
| Period During Gating Mode On (=p) | 3 | A CQI feedback is transmitted on the CQICH every 2^p frames while gating mode on |
| Inactivity Duration during Gating Mode On Duration (=B) | 3 | While in Gating Mode on, if there is no activity for 2^p × (B+1) frames, then the CQICH is not transmitted till the next Gating Mode initiation period. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 3 | This is the number of Frames between the Initiation Points (instants when MSS and |

TABLE 298-continued

CQICH alloc IE format

| Syntax | Size | Notes |
|---|---|---|
| | | infrastructure must enter Gating Mode On). This is measured in frames - the period is 2^p × 2^(D+1). |
| Gating Mode Duration (=d) | 3 | This is the duration for which the gating mode is considered on - If d== 000, the CQICH is deallocated. If d == 111, the MS should report until the BS command for the MS to stop, else the duration is 2^p × 2^(D+1) × 2^(d+1). |
| } | | |
| If (CQICH_MODE==011) { | | Packet Count based |
| Period During Gating Mode On (=p) | 3 | A CQI feedback is transmitted on the CQICH every 2^p frames while gating mode on |
| Packet Count during Gating Mode On (=B) | 5 | A CQI feedback is transmitted on the CQICH periodically (with period p) until B packets are received or the durations D and/or d elapse. |
| Frame offset | 3 | The MS starts reporting at the frame of which the number has the same 3 LSB as the specified frame offset. If the current frame is specified, the MS should start reporting in 8 frames |
| Period between gating Mode on initiation points (=D) | 5 | This is the number of Frames between the Initiation Points (instants when MSS and infrastructure must enter Gating Mode On). This is measured in frames - the period is 2^p × 2^(D+1) frames. |
| Gating Mode Duration (=d) | 3 | This is the duration for which the gating mode is considered on - If d == 000, the CQICH is deallocated. If d == 111, the MS should report until the BS command for the MS to stop, else the duration is 2^p × 2^(D+1) × 2^d. |
| Cumulative Mode | 1 | Cumulative setting. This parameter is relevant in the case where the required number of packets is not received before the end of the Gating Mode Period. In this case, if cumulative is equal to true, then the MSS does not enter Channel quality feedback DTX mode until it receives the packets not yet received from the prior Gating Mode Period(s) in addition to the packets for this current Gating Mode Period. In this case, if cumulative is equal to false, then the MSS enters Channel quality feedback DTX mode as soon as it receives the packets for the current Gating Mode Period. In other words, it ignores any packets which were not received during prior Gating Mode Period(s). |
| } | | |
| If (CQICH_MODE==100) { | | Byte Count based |
| Packet Size Indicator (=P) | 3 | 10*2^P bytes constitute a packet |
| Period During Gating Mode On (=p) | 3 | A CQI feedback is transmitted on the CQICH every 2^p frames while gating mode on |
| Packet Count during Gating Mode On (=B) | 5 | A CQI feedback is transmitted on the CQICH periodically (with period p) until B packets are received or the durations D and/or d elapse. |
| Frame offset | 3 | The MS starts reporting at the frame of which the number has the same 3 LSB as the specified frame offset. If the current frame is specified, the MS should start reporting in 8 frames |

TABLE 298-continued

CQICH alloc IE format

| Syntax | Size | Notes |
|---|---|---|
| Period between gating Mode on initiation points (=D) | 5 | This is the number of Frames between the Initiation Points (instants when MSS and infrastructure must enter Gating Mode On). This is measured in frames - the period is 2^p × 2^(D+1). |
| Gating Mode Duration (=d) | 3 | This is the duration for which the gating mode is considered on - If d== 000, the CQICH is deallocated. If d == 111, the MS should report until the BS command for the MS to stop, else the duration is 2^p × 2^(D+1) × 2^d. |
| Cumulative Mode | 1 | Cumulative setting. This parameter is relevant in the case where the require number of packets is not received before the end of the Gating Mode Period. In this case, if cumulative is equal to true, then the MSS does not enter Channel quality feedback DTX mode until it receives the packets not yet received from the prior Gating Mode Period(s) in addition to the packets for this current Gating Mode Period. In this case, if cumulative is equal to false, then the MSS enters Channel quality feedback DTX mode as soon as it receives the packets for the current Gating Mode Period. In other words, it ignores any packets which were not received during prior Gating Mode Period(s). |
| } | | |
| Padding | variable | The padding bits is used to ensure the IE size is integer number of bytes. |
| } | — | — |

Detailed message definitions for some 3GPP2-based embodiments follow. These message definitions provide some very specific examples of how a channel maintenance signaling policy may be established in a 3GPP2-based system. Section number references to the present TSG-C SWG 2.5, stage 3 text are provided to indicate which portions of the standard are being updated.

1.1.6.1.5

The access terminal shall obey the following rules when transmitting the DRC Channel:

Access terminal shall use DRCLength slots to send a single DRC. The DRC (value and cover) is defined to take effect at the slot boundary following the end of its transmission, and stay in effect for DRCLength slots.

The DRC (value and cover) shall not change in slots other than T such that:

$$(T+1-\text{FrameOffset}) \bmod DRC\text{Length}=0,$$

where T is the CDMA System Time in slots.

If the DRCGating is equal to 1, the access terminal shall transmit the DRC over a one slot period, starting in slot T that satisfies the following equation:

$$(T+2-\text{FrameOffset}) \bmod DRC\text{Length}=0,$$

where T is the CDMA System Time in slots.

If DRCDTXInterval is set to 0x01:

The access terminal shall begin the DRC DTX Interval starting in slot T that satisfies the following equation:

$$(\text{T}+1-\text{FrameOffset}-\text{DRCLength}\times\text{DRCDTXStagger}) \bmod (\text{DRCLength}\times\text{DRCDTXInterval}),$$

where T is the CDMA System Time in slots.

The access terminal shall transmit the DRC as indicated by the DRCGating bit.

The access terminal shall continue to transmit the DRC for at least the period indicated by DRCDTXActivePeriod.

If the access terminal successfully receives a Forward Traffic Channel Packet addressed to it during the period indicated by DRCDTXActivePeriod, the access terminal shall continue to transmit DRC for an additional period beyond current DRCDTXActivePeriod with length DRCDTXActivePeriod.

The Access Terminal may discontinue transmission of the DRC Channel at the end of the last DRCDTXActive period

TABLE 11.7.7.1-1

Configurable Values

| Attribute ID | Attribute | Values | Meaning |
|---|---|---|---|
| 0xff | DRCGating | 0x00 | Continuous transmission |
| | | 0x01 | Discontinuous transmission |
| 0xfe | DRCLockLength | 0x00 | DRCLock bit is repeated 8 times. |
| | | 0x01 | DRCLock bit is repeated 16 times. |
| | | 0x02 | DRCLock bit is repeated 32 times. |
| | | 0x03 | DRCLock bit is repeated 64 times. |
| | | All other values | Reserved |
| 0xfd | MultiUserPacketsEnabled | 0x00 | Use of Multi-User Packets is disabled |
| | | 0x01 | Use of Multi-User Packets is enabled |
| | | All other values | Reserved |
| 0xfc | DSCLength | 0x08 | Length of a single DSC transmission is 64 slots. |
| | | 0x01 to 0x20 | Length of a single DSC transmission in units of 8 slots. |
| | | All other values | Reserved |
| 0xfb | DeltaACKChannelGainMUP | 0x0c | DeltaACKChannelGain MUP is 6 dB. |
| | | 0x00 to 0x12 | DeltaACKChannelGain MUP in units of 0.5 dB. |
| | | All other values | Reserved |
| 0xfa | ShortPacketsEnabledThresh | 0x01 | ShortPacketsEnabledThresh is 2048 bits. |
| | | 0x00 | ShortPacketsEnabledThresh is 1024 bits. |
| | | 0x02 | ShortPacketsEnabledThresh is 3072 bits. |
| | | 0x03 | ShortPacketsEnabledThresh is 4096 bits. |
| | | All other values | Reserved |
| 0xf9 | DRCDTXSupported | 0x00 | DRC DTX mode is not supported |
| | | 0x01 | DRC DTX mode is supported |
| | | 0x02 to 0xff | Reserved |
| 0xf8 | DRCDTXInterval | 0x00 | DRC Channel DTX mode is disabled. |
| | | 0x01 to 0xf0 | Interval between transitions from DTX to transmission of DRC Channel while DRC Channel is in DTX mode, in slots. |
| | | 0xf0 to 0xff | Reserved |
| 0xf7 | DRCDTXActivePeriod | 0x00 | Reserved |
| | | 0x0a | The DRC Channel is transmitted during the first 10 × DRCLength slots of the DRCDTXInterval |
| | | 0x01 to 0xff | The number of slots in the beginning of the DRCDTXInterval during which the DRC Channel is transmitted = 10 × DRCDTXActivePeriod |

TABLE 11.7.7.1-1-continued

| Attribute ID | Attribute | Configurable Values | |
|---|---|---|---|
| | | Values | Meaning |
| 0xf6 | DRCDTXStagger | 0x00 to 0x8f | Offset, in slots × DRCLength of beginning of DRC DTX Interval |
| | | 0x90 to 0xff | Reserved |

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims. As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, computer program, and computer instructions, as used herein, are defined as a sequence of instructions designed for execution on a computer system. This sequence of instructions may include, but is not limited to, a subroutine, a function, a procedure, an object method, an object implementation, an executable application, an applet, a servlet, a shared library/dynamic load library, a source code, an object code and/or an assembly code.

What is claimed is:

1. A method for improved channel maintenance signaling comprising:

entering a high-rate-channel-maintenance mode by a processor of a remote unit in which a transceiver of the remote unit transmits channel maintenance signaling, wherein channel maintenance signaling comprises signaling of at least one type from the group consisting of channel quality indication (CQI) signaling, power control signaling, reverse dedicated pilot signaling, forward dedicated pilot signaling, and ACK/NACK signaling;

when a low-rate condition is met, the processor of the remote unit entering a low- rate- channel- maintenance mode in which the transceiver of the remote unit transmits channel maintenance signaling at one of a lower rate or a lower transmit power than when in the high-rate-channel-maintenance mode;

when a high-rate condition is met, the processor of the remote unit reentering the high- rate-channel-maintenance mode from the low-rate-channel-maintenance mode, wherein the high- rate condition comprises a condition from the group consisting of the remote unit detects that handoff conditions are present, the remote unit begins receiving data via a forward link associated with the channel maintenance signaling, and the time remaining until a next periodic, high-rate initiation point after the remote unit enters the low-rate-channel-maintenance mode has elapsed, and further comprising receiving an indication from an access network (AN) that the remote unit enter the high-rate-channel-maintenance mode from the low-rate-channel-maintenance mode wherein the indication that the remote unit enter the high-rate-channel-maintenance mode further indicates configuration information from the group consisting of the low-rate condition that the remote unit to enter the low-rate-channel-maintenance mode, a period of time between high-rate initiation points, and a frame offset for CQI signaling.

2. The method of claim 1, wherein the low-rate condition comprises a condition from the group consisting of:

a pre-established period of time has elapsed since entering the high-rate-channel-maintenance mode, a pre-established period of time has elapsed since entering the high-rate-channel-maintenance mode without detecting activity on a forward link associated with the channel maintenance signaling, a pre-established number of packets have been received via a forward link associated with the channel maintenance signaling, a pre-established number of bytes have been received via a forward link associated with the channel maintenance signaling, a cumulative number of packets have been received, via a forward link associated with the channel maintenance signaling, totaling the sum of a pre-established number for each high-rate initiation point that has passed, a cumulative number of bytes have been received via a forward link associated with the channel maintenance signaling, totaling the sum of a pre-established number for each high-rate initiation point that has passed, a pre-established number of packets have been successfully transmitted via a reverse link, and a pre-established number of bytes have been successfully transmitted via a reverse link.

3. The method of claim 1, wherein transmitting channel maintenance signaling at one of a lower rate or a lower transmit power than when in the high-rate-channel-maintenance mode comprises suspending channel maintenance signaling.

4. The method of claim 1, wherein CQI signaling comprises data rate control (DRC) signaling.

5. The method of claim 1, wherein the channel maintenance signaling comprises channel quality indication signaling but not reverse dedicated pilot signaling.

6. The method of claim 1, wherein transmitting CQI signaling comprises transmitting CQI signaling in accordance with one of a gated transmit pattern or a continuous transmit pattern.

7. The method of claim 1, further comprising sending an indication to an access network (AN) that the remote unit is entering the low-rate-channel-maintenance mode.

8. The method of claim 1, further comprising sending an indication to an access network (AN) that the remote unit is entering the high-rate-channel-maintenance mode.

9. A method for improved channel maintenance signaling comprising:

sending, by an access network (AN) to a remote unit, an indication that the remote unit to transition from a high-rate-channel-maintenance mode to a low-rate-channel-maintenance mode when a low-rate condition is met and that the remote unit to transition from the low-rate-channel-maintenance mode to the high-rate-channel-maintenance mode when a high-rate condition is met, wherein the high-rate condition comprises a condition from the group consisting of: the remote unit detects that handoff conditions are present, the remote unit begins receiving data via a forward link associated with the channel maintenance signaling, and the time remaining until a next periodic, high-rate initiation point after the remote unit enters the low-rate-channel-maintenance mode has elapsed, wherein the high-rate-channel-maintenance mode comprises a mode in which a remote unit transmits channel maintenance signaling, wherein channel maintenance signaling comprises signaling of at least one type from the group consisting of channel quality indication (CQI) signaling, power control signaling, reverse dedicated pilot signaling, forward dedicated pilot signaling, and ACK/NACK signaling, and wherein the low-rate-channel-maintenance mode comprises a mode in which the remote unit transmits channel maintenance signaling at one of a lower rate or a lower transmit power than when in the high-rate-channel-maintenance mode, and further comprising receiving an indication from the remote unit entering the low-rate- channel-maintenance mode or the high-rate-channel-maintenance mode wherein the indication further indicates configuration information from the group consisting of the low-rate condition that the remote unit to enter the low-rate-channel-maintenance mode the high-rate condition that the remote unit to enter the high-rate-channel-maintenance mode, a period of time between high-rate initiation points, and a frame offset for CQI signaling.

10. The method of claim 9, wherein the low-rate condition comprises a condition from the group consisting of:

a pre-established period of time has elapsed since entering the high-rate-channel-maintenance mode, a pre-established period of time has elapsed since entering the high-rate-channel-maintenance mode without detecting activity on a forward link associated with the channel maintenance signaling, a pre-established number of packets have been received via a forward link associated with the channel maintenance signaling, a pre-established number of bytes have been received via a forward link associated with the channel maintenance signaling, a cumulative number of packets have been received, via a forward link associated with the channel maintenance signaling, totaling the sum of a pre-established number for each high-rate initiation point that has passed, a cumulative number of bytes have been received via a forward link associated with the channel maintenance signaling, totaling the sum of a pre-established number for each high-rate initiation point that has passed, a pre-established number of packets have been successfully transmitted via a reverse link, and a pre-established number of bytes have been successfully transmitted via a reverse link.

11. The method of claim 9, further comprising buffering, by the AN, data for delivery to the remote unit until the remote unit is expected to reenter the high-rate-channel-maintenance mode.

12. The method of claim 9, further comprising allocating a reverse link resource, used by the remote unit while in the high-rate-channel-maintenance mode, to a second remote unit for at least a portion of the interval in which the remote unit is expected to be in the low-rate-channel-maintenance mode.

13. The method of claim 12, further comprising sending a reverse link assignment message that assigns a reverse link resource to the second remote unit for a periodically reoccurring interval of time, thereby enabling the reverse link resource to be shared by a plurality of remote units.

14. A remote unit comprising:

a transceiver;

a processing unit, communicatively coupled to the transceiver, adapted to enter a high-rate-channel-maintenance mode in which channel maintenance signaling is transmitted via the transceiver, wherein channel maintenance signaling comprises signaling of at least one type from the group consisting of channel quality indication (CQI) signaling, power control signaling, reverse dedicated pilot signaling, forward dedicated pilot signaling, and ACK/NACK signaling, adapted to enter, when a low-rate condition is met, a low-rate-channel-maintenance mode in which channel maintenance signaling is transmitted via the transceiver at one of a lower rate or a lower transmit power than when in the high-rate-channel-maintenance mode, and adapted to reenter, when a high-rate condition is met, the high-rate-channel-maintenance mode from the low-rate-channel-maintenance mode, wherein the high-rate condition comprises a condition from the group consisting of the remote unit detects that handoff conditions are present, the remote unit begins receiving data via a forward link associated with the channel maintenance signaling, and the time remaining until a next periodic, high-rate initiation point after the remote unit enters the low-rate-channel-maintenance mode has elapsed, and further comprising receiving an indication from the remote unit entering the low-rate-channel-maintenance mode or the high-rate-channel-maintenance mode wherein the indication further indicates configuration information from the group consisting of the low-rate condition that the remote unit to enter the low-rate-channel-maintenance mode.

the high-rate condition that the remote unit to enter the high-rate-channel-maintenance mode, a period of time between high-rate initiation points, and a frame offset for CQI signaling.

15. An access network (AN) comprising:

a transceiver a network interface;

a processing unit, communicatively coupled to the transceiver and the network interface, adapted to send, to a remote unit via the transceiver, an indication that the remote unit to transition from a high-rate-channel-maintenance mode to a low-rate-channel-maintenance mode when a low-rate condition is met and that the remote unit to transition from the low-rate-channel-maintenance mode to the high-rate-channel-maintenance mode when a high-rate condition is met, wherein the high-rate condition comprises a condition from the group consisting of: the remote unit detects that handoff conditions are present, the remote unit begins receiving data via a forward link associated with the channel maintenance signaling, and the time remaining until a next periodic, high-rate initiation point after the remote unit enters the low-rate-channel-maintenance mode has elapsed, wherein the high-rate-channel-maintenance mode comprises a mode in which a remote unit transmits channel maintenance signaling, wherein channel maintenance signaling comprises signaling of at least one type from the group consisting of channel quality indication (CQI) signaling, power control signaling, reverse dedicated pilot signaling, forward dedicated pilot signaling, and ACK/NACK signaling, and wherein the low-rate-channel-maintenance mode comprises a mode in which the remote unit transmits channel maintenance signaling at one of a lower rate or a lower transmit power than when in the high-rate-channel-maintenance mode, and further comprising receiving an indication from the access network that the remote unit enter the high-rate-channel-maintenance mode from the low-rate-channel-maintenance mode wherein the indication that the remote unit enter the high-rate-channel-maintenance mode further indicates configuration information from the group consisting of the low-rate condition that the remote unit to enter the low-rate-channel-maintenance mode.

a period of time between high-rate initiation points, and a frame offset for CQI signaling.

* * * * *